United States Patent
Hankins, Jr. et al.

(10) Patent No.: US 9,135,458 B1
(45) Date of Patent: Sep. 15, 2015

(54) SECURE FILE TRANSFER SYSTEMS AND METHODS

(71) Applicants: Benjamin B. Hankins, Jr., Great Falls, VA (US); Christopher W. MacTaggart, Pittsburgh, PA (US); Andrew J. Milisits, Jr., Boyds, MD (US)

(72) Inventors: Benjamin B. Hankins, Jr., Great Falls, VA (US); Christopher W. MacTaggart, Pittsburgh, PA (US); Andrew J. Milisits, Jr., Boyds, MD (US)

(73) Assignees: Aitheras, LLC., Rockville, MD (US); Northeastern, LLC., Pittsburgh, PA (US)

( * ) Notice: Subject to any disclaimer, the term of this patent is extended or adjusted under 35 U.S.C. 154(b) by 0 days.

(21) Appl. No.: 14/187,286

(22) Filed: Feb. 23, 2014

(51) Int. Cl.
*H04L 29/06* (2006.01)
*G06F 21/60* (2013.01)

(52) U.S. Cl.
CPC ............... *G06F 21/606* (2013.01); *H04L 63/04* (2013.01)

(58) Field of Classification Search
CPC ......... G06F 21/00; G06F 21/60; G06F 21/62; G06F 21/6218; G06F 21/6272; G06F 17/30067; G06F 17/30082; H04L 63/10; H04L 63/101
See application file for complete search history.

(56) References Cited

U.S. PATENT DOCUMENTS

| | | | | |
|---|---|---|---|---|
| 2004/0215673 | A1* | 10/2004 | Furukawa et al. | 707/204 |
| 2009/0298479 | A1* | 12/2009 | Kasama | 455/414.1 |
| 2010/0250531 | A1* | 9/2010 | Andersen et al. | 707/736 |
| 2014/0032759 | A1* | 1/2014 | Barton et al. | 709/225 |

* cited by examiner

*Primary Examiner* — Yogesh Paliwal
(74) *Attorney, Agent, or Firm* — Nixon & Vanderhye PC

(57) ABSTRACT

Certain example embodiments relate to file transfer systems and/or methods that enable a single provider to offer to different customers customizable file transfer solutions that are secure, scalable to handle enterprise-level amounts of data, and able to meet customer-specific needs even though such needs are not necessarily known in advance. Once initially set up, the file transfer solution of certain example embodiments delegates management of the customer-specific instances of the solution, optionally in a sub-delegatable manner and, thus, the single provider need not be consulted after specific initial instance deployment time (e.g., for security management and/or other routine maintenance issues).

34 Claims, 45 Drawing Sheets

Upload A New Item

Name: baby picture
Description:
File: Upload a file

Save  Cancel

FIG. 15

Name: 2d55b35da5b300e318a2954.jpg
Description: this is a picture of the baby
File: 2d55b35da5b...318a2954.jpg  0.2MB Save  Cancel Min - Min Password Length; Max - Max Password Length; L - Letter Count in Password; N - Number Count in Password; S - Special Character Count in Password Password Parameters:

| Rule Name ▲ | Reset Circle ⇅ | MF Auth ⇅ | Created Date ⇅ | Update Date ⇅ | Active ⇅ | Actions |

Search

No records to display

Showing 0 to 0 of 0 entries

Add a New Rule

[First] [Previous] [Next] [Last]

Add a New Password Rule

*Name:
Min Length:
Max Length:
Letter Count:
Number Count:
Special Character Count:
Password Reset Cycle:
Days between reset cycle:
Multi Factor Authentication
Active Save    Cancel Application Settings Force Download Limitation: 50
(Blank field means that Download Count is unlimited)

Force Destruction Day Frame: 50
(Blank field means that Destruction Day is undefined)

Account Password Expire Day Frame: 32
(Blank field means that Password Expire Day is undefined)

Save

Add a New Regular Account

Manage Accounts
- Add A New User
- Account Permissions
- Account Files
- Password Rules
- Application Settings
- View Action Logs

*Email: [                    ]

Password Expire Date: [2014-02-03]

Account Expire Date: [                    ]

Role: [           ▼]

Lock: ■

Active: ▶

Password Rule: [Please select ...        ▼]
View Selected Password Rule
(this rule will override default role rule)

Valid Account IPs: [                                    ]

Please type 4 values divided by '.';
'*' means any symbols from 0 to 255;
10-250 means interval of values from 0 to 250.
Example: 10.10.10.1; 10.*.*.10; 10.10-250.10.*

[ Save ]   [ Cancel ]

FIG. 21

Add a New Regular Account

*Email:

Password Expire Date: 2014-02-03

Account Expire Date:

Role: Regular User / External admin

Lock

Active

Password Rule: Please select...
View Selected Password Rule
(this rule will override default role rule)

Valid Account IPs

Please type 4 values divided by '.'.
'*' means any symbols from 0 to 255;
10-250 means interval of values from 0 to 250.
Example: 10.10.10.1; 10.*.*.10; 10.10-250.10.*

Save   Cancel

FIG. 22

| 2d55b35da5b300e318a2954.jpg | | Download Notification: Off | 240600 Bytes | 2014-01-02 16:07:28.851 | 2014-01-02 16:07:28.851 | ✉ ◉ ✎ ✕ |
|---|---|---|---|---|---|---|
| items worth considering | yes | Upload Notification: Off | | 2014-01-02 16:06:27.733 | 2014-01-02 16:06:27.733 | Send link ✎ ✕ |
| newthings | | Upload Notification: Off | | 2014-01-02 16:06:27.437 | 2014-01-02 16:06:27.437 | ✎ ✕ |

Showing 1 to 3 of 3 entries

| Create a New Folder | Upload a New Item | Send File Request |

First | Previous | 1 | Next | Last

FIG. 23

Send Download Link Dialog

Destination Email:

Download Expire Date: 2014-02-21

Download Count: 50

Please leave password fields as blank if you don't want to protect download link by password Download Password:

Repeat Password:

Valid Download IPs

Please type 4 values divided by '.';
'*' means any symbols from 0 to 255;
10-250 means interval of values from 0 to 250.
Example: 10.10.10.1; 10.*.*.10; 10.10-250.10.*

[Send Link] [Cancel]

FIG. 24

Send Download Link Dialog

Destination Email: cmac@atheras.com

Download Expire Date: 2014-02-21

Download Count: 50

Please leave password fields as blank if you don't want to protect download link by password Download Password: ········

Repeat Password: ········

Valid Download IPs

Please type 4 values divided by '.';
'*' means any symbols from 0 to 255;
10-250 means interval of values from 0 to 250.
Example: 10.10.10.1; 10.*.*.10; 10.10-250.10.*

[Send Link] [Cancel]

FIG. 25

Send File Request Dialog

*Destination Email: cmac@aitheras.com

*Name: Christopher MacTaggart

*Short file description: That picture of the baby

Additional message:
Chris,
Can you send me the picture of the baby that we talked about earlier?

Folder: ROOT/

[Send] [Cancel]

Ethersend

Welcome super@ethersend.com | Accounts | Logout

Manage Accounts
Email Templates
Password Rules
Application Settings
View Action Logs Search

| Template ID ▲ | Description | Email Header | Email Content | Actions |
|---|---|---|---|---|
| AccountActivation | Email template for notify user that his account is activated | Ethersend Account Activated | You have successfully activated an ethersend account for the organization ${companyName} that uses the address ${userEmail} to login. To login to this account, please visit the following URL: ${loginLink}. Thanks, Ethersend Admin. | ✎ |
| AutomaticUserInform | Email template for informing user about events automatically | Ethersend Security Notice: ${event} | This is an automated message to inform you that on ${date}, the following event occurred regarding your Ethersend account for login ${email} associated with the organization ${companyName}: ${event} If you initiated and are aware of this event, please disregard this message. If you did not initiate this event, please change your password immediately. If you require additional assistance, please contact support@ethersend.com Regards, Ethersend Security | ✎ |
| DownloadFileNotifEmail | Ethersend notifies file's owner if any other user download file | Account ${account.email} has downloaded file | Dear, ${owner.email} Account ${account.email} has downloaded file ${file.name}" Ethersend Notification service | ✎ |
| InviteNewUserEmail | Email template for new user | Your account has been created | Dear, ${email} Your account for Ethersend portal has been ${action} by Ethersend admin. Please use the following data to log in to Ethersend portal. Url: ${url} Email: ${email} Password: ${password} Best regards Ethersend Notification Service | ✎ |
| ReEncryptJobFailedEmail | Email template for informing super admins that ReEncryptJob failed | ReEncryptJob failed | Informing you, ${email}, that ReEncryptJob failed. This storage items where not reencrypted: ${itemList} | ✎ |
| RegisterUserEmail | Email template for confirming user registration | Confirm Email | Dear, ${name} to confirm your email and activate your Ethersend account, please go to ${registrationLink}. Once you confirm your email address and activate your account, you will be able to login at the following URL: ${loginLink} Best regards. Ethersend Notification Service | ✎ |
| RequestFileEmail | Email template for file request | File Request | Dear ${name} ${sender} has requested a file (${fileDescription}) from you to be sent via secure transfer using the Ethersend secure file transfer portal. Please follow this link or copy and paste the URL below into your web browser: ${uploadUrl} Additional message: ${text} Thanks, ${sender} | ✎ |
| SendPwdProtectedLinkEmail | Email template for password protected download link | Secure Download Link | Dear, ${account.email} A file has been sent to you by an Ethersend account with the email address of ${owner.email} The file name is: ${file.name} The password to download this file is: ${downloadPassword} To download this file, please go to ${downloadLink} Best regards Ethersend Notification Service | ✎ |
| SendSecureLinkEmail | Email template for secure download | Secure Download Link | Dear, ${account.email} A file has been sent to you by an Ethersend account with the email address of | ✎ |

Ethersend

Welcome super@ethersend.com | Accounts | Logout

Manage Accounts
- Email Templates
- Password Rules
- Application Settings
- View Action Logs

Search

| Action Name | Action Owner | Action Date | Action Information | Client Information |
|---|---|---|---|---|
| ACCOUNT | anonymous account | 2013-11-06 01:52:23 | A new account has been registered with email=regular3@ethersend.com | IP:193.24.30.26, Session ID::FEDB2C9317514A6C2A5C721C9C98AA1 Browser: Mozilla/5.0 (Windows NT 6.1; WOW64) AppleWebKit/537.36 (KHTML, like Gecko) Chrome/27.0.1453.110 Safari/537.36 |
| ACCOUNT | super@ethersend.com | 2013-11-13 12:09:40 | Account with email='t@.t.tt' has been removed | IP:193.24.30.26, Session ID::14550CB3F404E53C29FED2ABCCE47FF6 Browser: Mozilla/5.0 (Windows NT 6.1; WOW64) AppleWebKit/537.36 (KHTML, like Gecko) Chrome/27.0.1453.110 Safari/537.36 |
| ACCOUNT | anonymous account | 2013-11-12 06:04:29 | A new account has been registered with email=regular3@ethersend.com | IP:193.24.30.26, Session ID::EC45F761993F16618E339F0B8E18424A Browser: Mozilla/5.0 (Windows NT 6.1; WOW64) AppleWebKit/537.36 (KHTML, like Gecko) Chrome/27.0.1453.110 Safari/537.36 |
| ACCOUNT | anonymous account | 2013-11-12 04:17:18 | Paid account signup workflow has been completed for t@t.tt | IP:193.24.30.26, Session ID::39E8E421F9C89C1CC30AA30A1FE51078 Browser: Mozilla/5.0 (Windows NT 6.1; WOW64) AppleWebKit/537.36 (KHTML, like Gecko) Chrome/27.0.1453.110 Safari/537.36 |
| ACCOUNT | super@ethersend.com | 2013-11-12 04:01:18 | Account with email='regular3@ethersend.com' has been updated | IP:193.24.30.26, Session ID::6FBC188AD05218E0640364374l0D7549 Browser: Mozilla/5.0 (Windows NT 6.1; WOW64) AppleWebKit/537.36 (KHTML, like Gecko) Chrome/27.0.1453.110 Safari/537.36 |
| ACCOUNT | super@ethersend.com | 2013-11-11 04:22:18 | Account with email='t@.t.tt' has been updated | IP:193.24.30.26, Session ID::6A851848A3C24E4875F7F3F888E36E29 Browser: Mozilla/5.0 (Windows NT 6.1; WOW64) AppleWebKit/537.36 (KHTML, like Gecko) Chrome/27.0.1453.110 Safari/537.36 |
| ACCOUNT | super@ethersend.com | 2013-11-15 11:22:32 | Account with email='regular3@ethersend.com' has been removed | IP:193.24.30.26, Session ID::5C6F176F9BB264FD40691670B4C7EF2D Browser: Mozilla/5.0 (Windows NT 6.1; WOW64) AppleWebKit/537.36 (KHTML, like Gecko) Chrome/27.0.1453.110 Safari/537.36 |
| ACCOUNT | super@ethersend.com | 2013-11-08 04:05:50 | A new account with email='t@.rr' has been created | IP:193.24.30.26, Session ID::5A8A939B446D60CB24A95C5C74BEAA1 Browser: Mozilla/5.0 (Windows NT 6.1; WOW64) AppleWebKit/537.36 (KHTML, like Gecko) Chrome/27.0.1453.110 Safari/537.36 |
| ACCOUNT | anonymous account | 2013-11-08 11:28:41 | A new account has been registered with email='regular3@ethersend.com | IP:193.24.30.26, Session ID::0B27CEB817CD628106BA614AE50FE6DB Browser: Mozilla/5.0 (Windows NT 6.1; WOW64) AppleWebKit/537.36 (KHTML, like Gecko) Chrome/27.0.1453.110 Safari/537.36 |
| ACCOUNT | super@ethersend.com | 2013-11-06 01:56:44 | Account with email=regular@ethersend.com has been removed | IP:193.24.30.26, Session ID::31F9992E9DD995F6110C0D324AEFA796 Browser: Mozilla/5.0 (Windows NT 6.1; WOW64; rv:25.0) Gecko/20100101 Firefox/25.0 |

FIG. 37

SECURE FILE TRANSFER SYSTEMS AND METHODS

TECHNICAL FIELD

Certain example embodiments relate to file transfer systems and/or methods. More particularly, certain example embodiments relate to file transfer systems and/or methods that enable a single provider to offer to different customers customizable file transfer solutions that are secure, scalable to handle enterprise-level amounts of data, and able to meet customer-specific needs even though such needs are not necessarily known in advance. Certain example embodiments employ a delegatable delegation of authority to the customer-specific instances of the solution.

BACKGROUND AND SUMMARY

More and more people are relying on electronic forms of communication in their day-to-day lives. It is possible to send letters, pictures, movies, and other sorts of information electronically. Indeed, the amount and type of information being transmitted seems to increase almost daily.

There are a number of benefits associated with the transition to electronic forms of communication. For example, email, SMS, and other forms of communications can be exchanged almost instantaneously between people located almost anywhere around the globe. Electronic communications also can have a net positive environmental impact, e.g., as more and more individuals and companies strive to go paperless in their homes and/or offices.

Large enterprises, which may have multiple domestic and/or international locations, cooperate with other corporations or individuals in different places, etc., also can leverage the benefits of electronic communications. Through technological tools, business process orchestration and management techniques can help large enterprises achieve new efficiencies.

Unfortunately, not all individuals fully "trust" electronic communications. For example, when it comes to delivering financial statements, paying bills, etc., many people still rely on paper, at least to some extent, e.g., because of a perceived security risk. Individuals also sometimes wonder about personal privacy, even where non-financial data is concerned. These perceived issues can complicate, and sometimes prevent, information exchanges as between individuals, and as between an individual and an organization.

The ability to leverage the benefits of information technology on the part of organizations also has in the past met with challenges. For instance, large enterprises oftentimes are not able to leverage "off-the-shelf" solutions for migrating business practices from traditional paper operations to purely electronic solutions, much less to hybrid solutions. In order to arrive at a usable system, an enterprise might well have to resort to a custom-developed software and/or hardware package. The development of such a proprietary solution might require a deep knowledge of the internal business processes, types of data to be handled, etc., thereby imposing constraints on who can develop such solutions, increasing development costs, and potentially exposing sensitive organizational and/or personal information. As a result, proprietary "solutions" for data transfers typically are not very flexible and typically are not applicable or easily adaptable to meet the needs of other organizations, even when those needs at least on a conceptual level are the same or somewhat similar as between the different organizations.

Similar challenges are faced when attempting to integrate or coordinate operations between different providers across different organizations, different units in a single large organization, etc. Again, custom development typically is needed and oftentimes results in a "solution" that is custom-developed in an inflexible and inextensible manner.

Thus, it will be appreciated that there is a need in the art for improved file transfer systems and/or methods that are secure and that are adaptable for use by different organizations with requirements that are not necessarily known a priori.

Certain example embodiments relate to file transfer systems and/or methods that address these and/or other issues.

One aspect of certain example embodiments relates to a file transfer solution, offered by a single provider, that enables different customers to customize their own file transfer solutions that are secure, scalable to handle enterprise-level amounts of data, and able to meet customer-specific needs even though such needs are not known in advance.

Another aspect of certain example embodiments relates to delegating management responsibilities of the customer-specific instances of the single file transfer solution, in an optionally sub-delegatable manner. Advantageously, the single provider need not be consulted after deployment time, e.g., for security management and/or other routine maintenance issues.

Another aspect of certain example embodiments enables different enterprises to set up and manage their own secure portals to data, with those secure portals being set up for themselves, for other enterprises, and/or for individuals.

Still another aspect of certain example embodiments relates to facilitating two-way file transfers in a convenient manner.

Yet another aspect of certain example embodiments relates to facilitating file transfers in which recipient parties do not need to sign up for user accounts but still are able to access the files sent to them.

In certain example embodiments, there is provided a secure file transfer system comprising processing resources including at least one processor and a memory, and a non-transitory data store. The processing resources are configured to: receive requests from customers to establish top-level accounts with the secure file transfer system; in response to received requests, allocate portions of the non-transitory data store for the customers making the respective requests, and create a dedicated portal for each said top-level account; and facilitate transfers of computer-storable assets to and/or from users associated with the respective top-level accounts through downloads and/or uploads of such assets through the respective dedicated portals and using the respective allocated portions of the non-transitory data store. All or substantially all desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

In certain example embodiments, a method of operating a secure file transfer system having processing resources including at least one processor and a memory, as well as a non-transitory data store, is provided. Requests are received from customers to establish top-level accounts with the secure file transfer system. In response to a received request to establish a top-level account: a portion of the non-transitory data store is allocated for the customer making the respective request, and a dedicated portal is created for the respective top-level account. Transfers of computer-storable assets to and/or from users associated with the respective top-level accounts through downloads and/or uploads of such assets are facilitated through respective dedicated portals and using respective allocated portions of the non-transitory data store. All or substantially all desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

In certain example embodiments, there is provided at least one non-transitory computer readable storage medium tangibly storing instructions that, when performed by processing resources including at least one processor of a secure file transfer system, at least: process requests received from customers to establish top-level accounts with the secure file transfer system; in response to a received request to establish a top-level account: allocate a portion of a non-transitory data store of the secure file transfer system for the customer making the respective request, and create a dedicated portal for each said top-level account; and facilitate transfers of computer-storable assets to and/or from users associated with the respective top-level accounts through downloads and/or uploads of such assets through the respective dedicated portals and using the respective allocated portions of the non-transitory data store. All or substantially all desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

In certain example embodiments, a file transfer system is provided. There are provided processing resources including at least one processor, and a non-transitory data store. The processing resources are configured to: maintain a plurality of file transfer system instances, each said file transfer system instance being scalable to accommodate a number of users expected for an enterprise-wide operation and an amount of data suitable for an enterprise, regardless of how many users actually use, and how much data is actually stored to the non-transitory data store in connection with, the respective file transfer system instance; generate new file transfer system instances upon receipt of corresponding verified user requests; for each said file transfer system instance, provide a sub-delegable delegation of authority to exactly one administrator of the respective file transfer system instance that at least enables specification of an approach to be used in sharing data storable to the non-transitory data store among and/or between users who, directly or indirectly, use the respective file transfer system instance; and for each said file transfer system instance, facilitate the sharing of data, using the non-transitory data store and the respective specified approach to be used in sharing data, and in accordance with the respective sub-delegable delegation of authority, among and/or between the users who, directly or indirectly, use the respective file transfer system instance. For each said file transfer system instance, (a) how the respective approach to be used in sharing data will be specified, (b) whether and how the respective sub-delegable delegation of authority will be distributed, (c) the identities of users, other than the one administrator, who will actually use the respective file transfer system instance, and (d) the amount of data that actually will be stored in connection with the respective file transfer system instance, are at least initially not known to the file transfer system and thereafter can be influenced by users in accordance with the respective sub-delegable delegation of authority in ways not knowable to the file transfer system in advance. Corresponding methods and/or non-transitory computer readable storage media may be provided in certain example embodiments.

The features, aspects, advantages, and example embodiments described herein may be combined in any suitable combination, sub-combination, or combination of sub-combinations, to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 11 is an example main view screen in accordance with an example embodiment;

FIG. 12 is an example screen for creating a new folder in accordance with an example embodiment;

FIG. 13 is an example update to the screen of FIG. 11, following the creation of a folder using the FIG. 12 example screen and scenario posited therein;

FIG. 14 is an example screen enabling the uploading of new items, in accordance with an example embodiment;

FIG. 15 is an example screen showing a successful upload from the FIG. 14 example;

FIG. 16 is an example screen showing password rule configuration, in accordance with an example embodiment;

FIG. 17 is an example screen showing how new password rules may be setup in accordance with an example embodiment;

FIG. 18 is an example screen showing how applications setting may be specified in accordance with an example embodiment;

FIG. 19 is an example action log screen that may be used with an example embodiment;

FIG. 20 is an example screen enabling a user to manage accounts, in accordance with an example embodiment;

FIG. 21 is an example screen for adding new users in accordance with an example embodiment;

FIG. 22 is an expanded portion of a drop-down menu from FIG. 21;

FIG. 23 is an enlarged portion of FIG. 13, indicating that a file is about to be sent;

FIG. 24 is an example screen that may be used for "sending" a file in accordance with an example embodiment;

FIG. 25 shows portions of the FIG. 24 example screen being filled out, e.g., to specify certain security features, in accordance with an example embodiment;

FIG. 28 is an example screen that may be used to send a file request in accordance with an example embodiment;

FIG. 30 is an example secure upload dialog box that may be accessed following a selection of the link provided in the FIG. 29 example notification, in accordance with an example embodiment;

FIG. 31 shows a successful upload operation using the FIG. 30 example upload screen, in accordance with an example embodiment;

FIG. 33 is an example account management screen for the super admin user, similar to that shown in FIG. 20, in accordance with an example embodiment;

FIG. 34 is an example notification template screen that may be used in accordance with an example embodiment;

FIG. 35 is an example password rules management screen for the super admin user, similar to that shown in FIG. 16, in accordance with an example embodiment;

FIG. 37 is an example action log screen, similar to that shown in FIG. 19, that may be used with an example embodiment;

FIGS. 38, 38A-D, 38E-1, 38E-2, 38E-3, 38F-1, 38F-2, 38G-1, and 38G-2 depict an example schema showing a back-end database managing overall system operations in accordance with certain example embodiments.

DETAILED DESCRIPTION

Certain example embodiments relate to file transfer systems and/or methods that enable a single provider to offer to different customers customizable file transfer solutions that are secure, scalable to handle enterprise-level amounts of data, and able to meet customer-specific needs even though such needs are not necessarily known in advance. Once initially set up, the file transfer solution of certain example embodiments delegates management of the customer-specific instances of the solution, optionally in a sub-delegatable manner and, thus, the solution provider need not be consulted after specific initial instance deployment time. For instances, customers may set up and manage their own secure portals to data, with those secure portals being set up by themselves, for users associated with the customer and/or for outside users (such as external organizations or enterprises, individuals, etc.).

Figure 1:
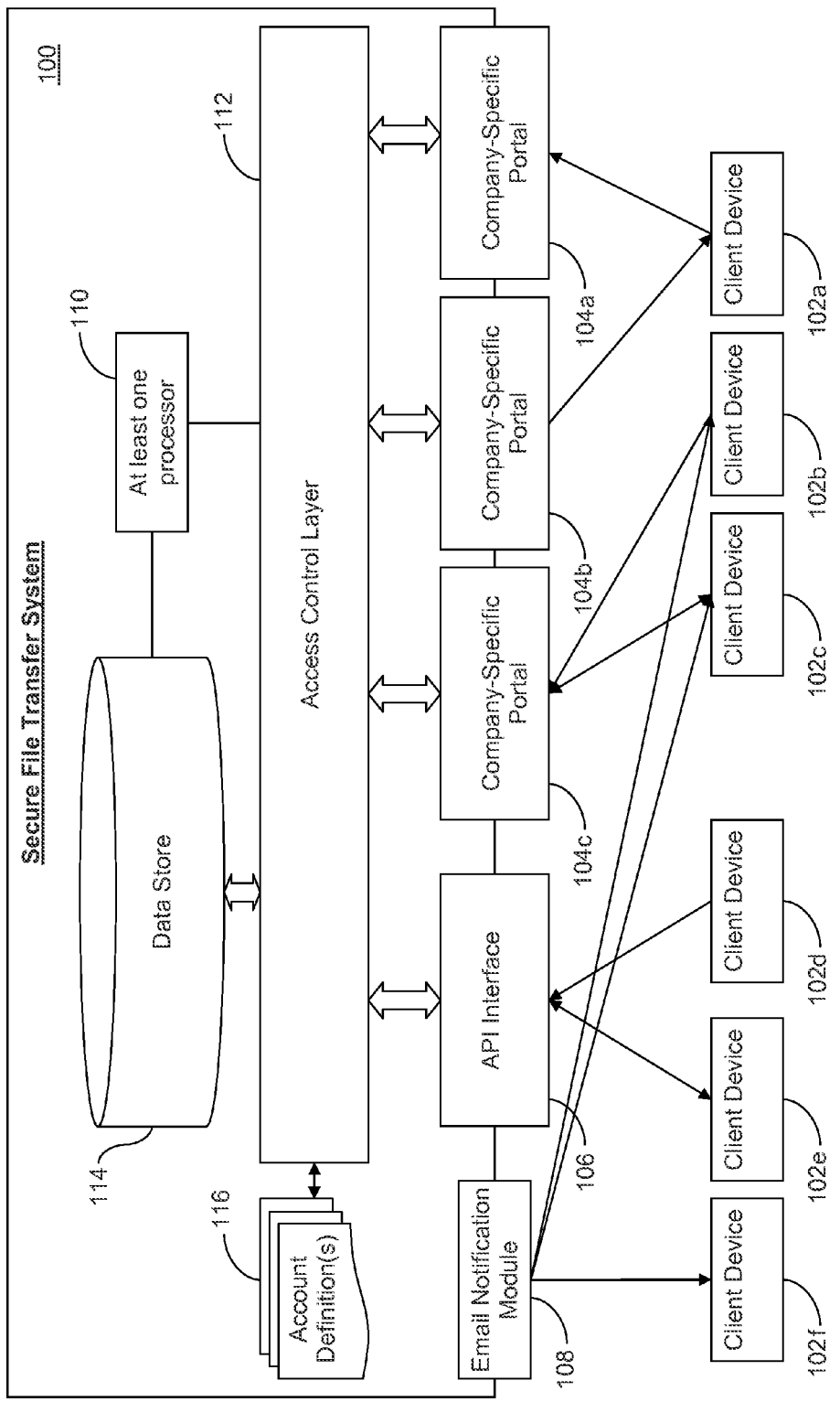
FIG. 1 is a block diagram of a secure file transfer system interacting with client devices, in accordance with an example embodiment.

Referring now more particularly to the drawings in which like reference numerals indicate like parts throughout the several views, FIG. 1 is a block diagram of a secure file transfer system 100 interacting with client devices, in accordance with an example embodiment. The overall architecture for the secure file transfer system 100 may be based on a cloud-based environment such as, for example, Amazon Linux AMI based EC2 system, with backing for the account definitions 116 and/or other functionality provided by an appropriate database such as, for example, an Oracle database, a SQL Server database, and/or the like. Java-based technologies may be used for web development, e.g., to facilitate online and easily portable applications, although different embodiments may use one or more other technology in place of, or in addition to, Java.

Client devices 102a-102f are able to interact with the system 100 through a variety of different means. For instance, as shown in FIG. 1, first client device 102a is able to send files to a first company-specific portal 104a and receive files from a second company-specific portal 104b. Second client device 102b, on the other hand, is able to send files via third company-specific portal 104c and receiving notifications via the email notification module 108. An Application Programming Interface (API) interface 106 may enable software applications to interact with the system 100 more seamlessly in certain example embodiments. And as shown in FIG. 1, different devices may communicate with multiple different portals in the same or different ways, etc.

Communications with the system may be mediated through the portals 104a-104c and the API interface 106 using any suitable protocol such as, for example, HTTP, HTTPS, and/or the like. Within the system, at least one processor may interface with the data store 114 and the access control layer 112 to ensure that communications are properly authenticated, etc., in accordance with account definitions 116.

In this regard, web browsers and/or the like may be used to access the portals 104a-104c in certain example embodiments, e.g., as facilitated by the Java based design noted above and/or the web service deployment discussed below. Web browser integration may provide security in accordance with requirements set forth in the account definitions 116, the desired functionality, and an easy to navigate design.

As will be described in further detail below, an instance of the example system 100 shown in FIG. 1 may be deployed for each top-level account that is set up, regardless of whether the top-level account is an enterprise, organization, individual, etc. The instances and/or the system 100 as a whole may be designed to automatically scale-up and scale-down processing and/or storage resources dynamically, e.g., as demand changes, without any manual intervention by the account holder and/or without any manual intervention by the system provider. In certain example embodiments, the account holder may not even know that the scale-up/scale-down is taking place. In certain example embodiments, the account holder may be informed that a scale-up is taking place, e.g., in the event that further payment is required for use of additional storage and/or processing resources. This approach may, for example, help in storage and processing efficiency, while also reducing costs to be borne by the system provider itself.

In certain example embodiments, it may be possible to optimize scaling up/down for efficiency and storage, while also attempting to reduce the amount of comingling (e.g., such that client data is as thoroughly separated as possible in some example scenarios). In certain example embodiments, EC2 instances may scale-up and scale-down in number based on actual usage, and the storage provisioned may increase with each client added. With today's commercially available hosting offerings, it is possible to provide one EC2 instance and 100 GB of storage for one user, and two EC2 instances and 1 TB of storage for ten users. It will, however, be appreciated that different backend cloud providers may change this calculus. In certain example embodiments, it may be desirable to favor "bucketizing" over efficiency, e.g., such that users with sensitive information or the like each are provided with their own dedicated instance(s).

The data store 114 may, for example, allow top-level accounts to store and transmit up to a predetermined amount of data. The amount of data may be, for example, up to 10 GB, 100 GB, 1 TB, 5 TB, for instance. In certain example embodiments, the predetermined amount of data may be based on a price paid by the organization. For example, a first threshold may be provided for free or trial accounts, a second threshold (higher than the first) may be provided for accounts at which a first price is paid, a third threshold (higher than the second) may be provided for accounts at which a second price (higher than the first) is paid, etc. Regardless of the total amount of space allocated to a user account, an individual file size limit (e.g., 1 GB, 10 GB, etc.) may be imposed in certain example embodiments. Although a customer account may have paid for 1 TB of storage, if only a partial subset of that storage is being used, certain example embodiments need not necessarily immediately allocate storage for the entire 1 TB of storage, e.g., so that the system scales on demand.

As alluded to above, the storage may be "bucketed" separately per user account, per user, and/or in some other way, in certain example embodiments, e.g., to help reduce the incidence of data comingling. This may be facilitated in certain example embodiments by virtue of the cloud-based storage system used. However, in certain example embodiments, the same hardware backing may be used, but security controls may be implemented (e.g., through the access control layer 112) to help ensure that users cannot access files in different "logical buckets." In certain example embodiments, data at rest in the data store 114 may be encrypted using any suitable technique. In certain example embodiments, a key rotation scheme may be implemented, e.g., to help reduce the risk from keys being compromised and to promote forward security.

Admin-level users may set access credentials and/or controls to be enforced by the access control layer 112. For instance, admin-level users may define password rules that will be enforced throughout their entire account, e.g., with the aid of the access control layer 112. Password controls may include, for example, minimum lengths, password reset cycles (e.g., specifying whether passwords need to be set and, if so, the regularity with which they need to be reset), and complexity (e.g., whether passwords must be of a predetermined length; whether they must include a combination or sub-combination of at least one letter, number, special character, and/or the like; etc.).

In this vein, the access control layer 112 may be used to help ensure that the client devices 102a-102f only "see" the data that they are allowed to see, once properly authenticated. Such authentication may include, for example, using multi-factor authentication (e.g., two-factor authentication) and providing views to the data provided in the data store 114 for properly authenticated users. Username and password combinations, keys, biometric indicators, and/or the like may be transmitted through the appropriate portal 104a-104c and/or the API interface 106 as appropriate, e.g., in a packet header, and passed to the access control layer 112 for this purpose.

Access passwords and the like may be hashed and salted, and not stored in plaintext format, in certain example embodiments. One-time use download passwords (e.g., for authenticating initial account signups, downloading emailed files, etc.) may be emailed or otherwise transmitted in plaintext format but not persisted in certain example embodiments. Such one-time use passwords may be verified as conforming to a predefined format, hashing to a particular known value, producing a certain CRC or other checksum, etc.

It thus will be appreciated that whether security is enabled, the type of the security that is put into place, etc., may be set by an admin user of an account. Different controls may be provided for different classes of user (e.g., such that some users such as users with admin privileges must authenticate with 2FA (or two-factor authentication), while others who do not have such privileges may use a simple username/password combination). In this regard, multi-factor authentication, and/or the order thereof, may be specified for different user levels throughout an entire account. In certain example embodiments, access may be limited by the Admin user to IP blocks, e.g., such that only certain IP blocks, individual addresses, and/or the like are "whitelisted." In addition, or in the alternative, certain IP addresses, IP blocks, and/or the like may be blacklisted. Such whitelisting and/or blacklisting techniques may be enforced at the portal level and/or at the access control layer 112.

As indicated above, an API interface 106 may be provided for the system. The API interface 106 may enable functionality to be embedded within existing end-user applications, new standalone clients, etc. The API interface 106 may, for example, facilitate web service and/or other calls that trigger bundles of executable logic in the system 100. The API with which the API interface 106 interacts preferably does not does sacrifice security and, thus, the underlying API may have function calls for authentication along the lines of the above, etc.

It will be appreciated that although FIG. 1 shows six client devices interacting with specific elements, the example techniques described herein are not so limited and may scale to accommodate hundreds or thousands of different users per portal, API instance, etc. Similarly, although three company specific portals are shown, the example techniques described herein are not so limited and may scale to accommodate hundreds or thousands of different portals.

As indicated above, each account holder may run an instance of the system 100. The instances may be customized based on the needs of the particular account holder. Several standard account types may be made available for users to match with predefined use cases. Other account types may be partially customized, e.g., using a standard account type as a template. Still other account types may be yet more fully customized at the outset. Each account may change through use, e.g., as an enterprise adds a supplier, replaces contractors, grows and adds employees, brings new operational units into its instance of the system, etc. An advantage of the techniques set forth herein is that authority is delegated from the system "super user" to an account holder for each account—and that account holder may further delegate the authority it is given, e.g., so that the account holder itself can manage its instance of the system without the intervention of the super user (or overall system provider). Thus, an account holder that changes in the above-described or other ways, or changes the ways in does business and communicates with employees, customers, partners, suppliers, etc., can continue to use its same instance over time and without the need for redesign and new development operations undertaken by the overall system provider.

User operations may be tracked in a database in certain example embodiments, and Admin users of an account may have read-only access to this audit trail and logging functionality. In certain example embodiments, no user accounts will be allowed to write to or otherwise change this audit trail data in any way. The type of information that may be tracked may include, for example, uploads, downloads, changes in security settings, new account creation, new account verification, etc. In certain example embodiments, an admin level user may specify which of these and/or other events are to be maintained in the audit trail or log.

A description of four common use cases will now be provided in connection with FIGS. 2-5. Although these use cases are believed to be the most likely used use cases, the system may provide these and/or other use cases as standard and ready-to-implement use cases and/or as use cases that may be further customized based on a particular need, etc. In certain example embodiments, the pricing model may allow for unlimited usage, unlimited transfer, unlimited users, charge by storage amount, restrictions on the number of clients or vendors or subcontractors as an absolute number or based on the amount of storage paid for, and/or the like. For instance, in certain example embodiments, an account holder may allow vendors, clients, subcontractors, and/or others to have 100 GB of storage and, if that account holder is paying for 1 TB of storage, it can have 10 suitable portals made available (assuming that the account holder does not want to reserve any space for itself).

Figure 2:
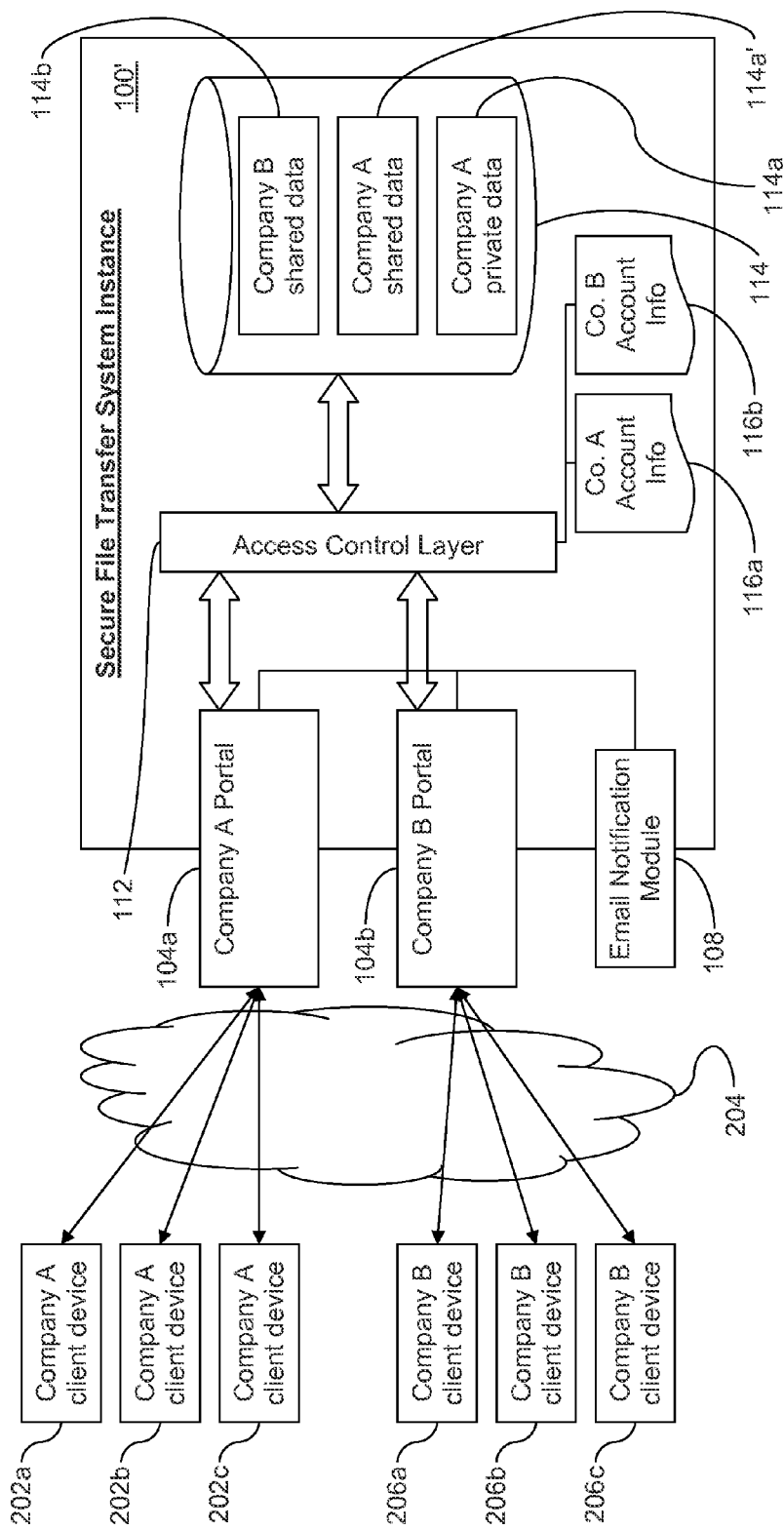
FIG. 2 is a block diagram of an instance of the secure file transfer system of FIG. 1 that helps demonstrate a first example use case, in accordance with an example embodiment.

FIG. 2 is a block diagram of an instance of the secure file transfer system of FIG. 1 that helps demonstrate a first example use case, in accordance with an example embodiment. In the FIG. 2 example use case, the following assumptions are made: Company A is a subcontractor of Company B, and Company A needs to receive sensitive data from Company B to perform its contracted work. Company A therefore opens an account, which creates a first secure file transfer system instance 100'. When Company A opens its account, account information 116a is generated, and a portal 104a is established, for Company A. Client devices 202a-202c of Company A can access Company A's private data 114a through this portal 104a and in accordance with the Company A account information 116a, as controlled through the access control layer 112. Because Company A needs to receive information from Company B, Company A defines Company B as one of its clients, thereby giving Company B its own portal 104b and the opportunity to connect through Company A's portal (although the credentials would give Company B employees access to the "Company B" hierarchy via Company A's portal) and limited access user accounts that may be used by Company B's client devices 206a-206c. Company B employees can log into the Company B portal 104b of Company A's account through the instance 100' using their client devices 206a-206c, upload files, and see other files uploaded by Company B, e.g., in the Company B shared data 114b of the data store 114. Company A also is able to see Company B's shared data 114b and thus can perform the work required.

Ultimately, Company A can designate some of its data as shared data 114a', e.g., in order to send files through the first instance 100' to a place viewable by Company B. Alternatively, or in addition, Company A may send a secure email notification via the email notification module 108, guiding Company B as to how it can obtain the shared data 114a'. This may, in certain example embodiments, send a link to an individual's email account, regardless of whether that individual has an account with the secure file transfer system. This approach may be helpful to people who do not have an account, as well as to those who could benefit from easier access to a file (e.g., even if they do have an account with the secure file transfer system), for example, by avoiding requiring those individuals to find and/or retrieve a specific file through a potentially complex technological ecosystem, etc.

Figure 3:
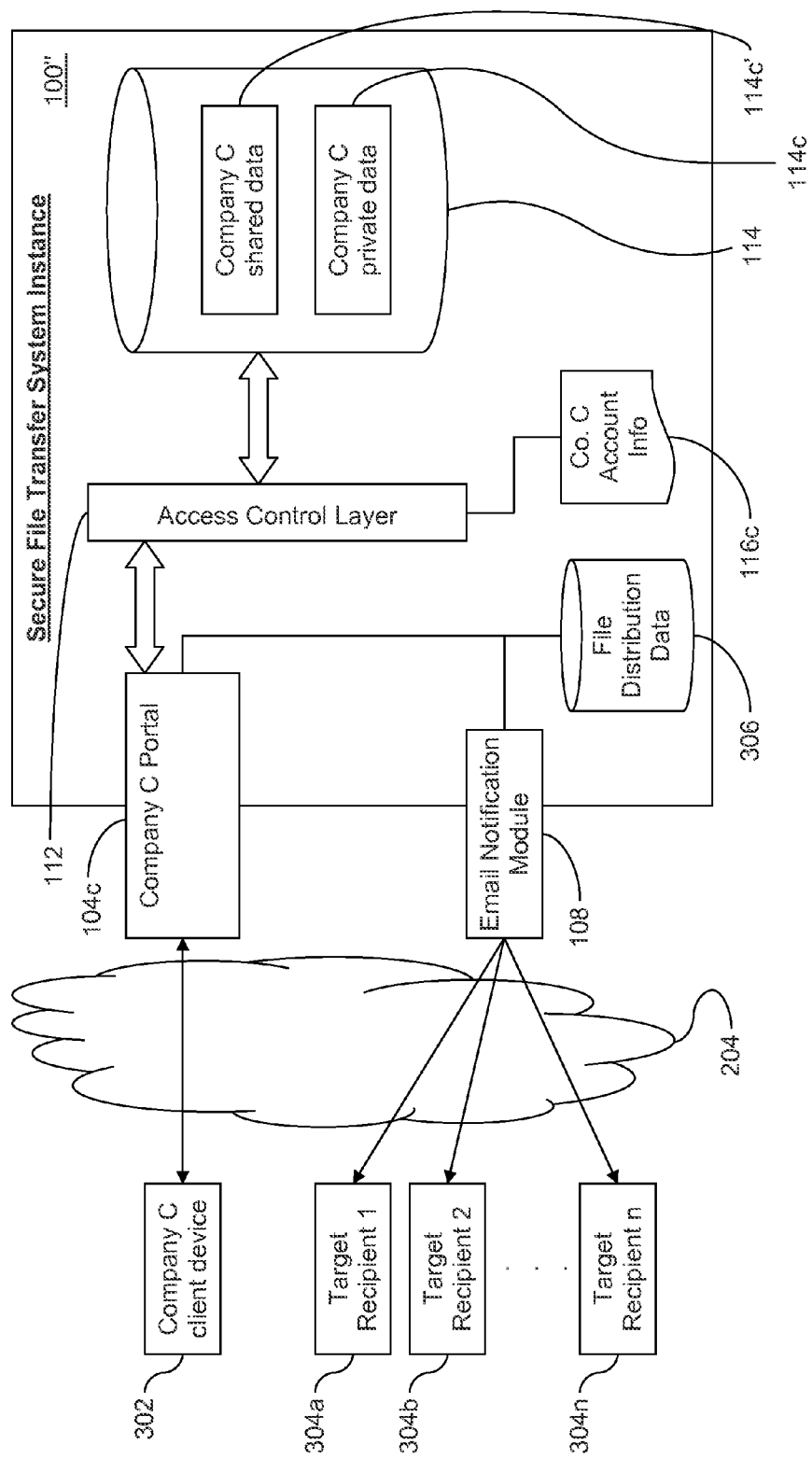
FIG. 3 is a block diagram of an instance of the secure file transfer system of FIG. 1 that helps demonstrate a second example use case, in accordance with an example embodiment.

FIG. 3 is a block diagram of an instance of the secure file transfer system of FIG. 1 that helps demonstrate a second example use case, in accordance with an example embodiment. In this example use case, an assumption is made that Company C has many clients to which it needs to transmit secure files. Company C opens an account and a second secure file transfer system instance 100" is generated. Company C, using client device 302, is able to upload information to the data store 114 via the Company C portal 104c, e.g., in accordance with the Company C account information 116c. Some of the uploaded data may be private data 114c made accessible within Company C only in some instances. On the other hand, the data to be shared may be stored as Company C shared data 114c'. Company C may, using the Company C portal 104c, select the files to be emailed within the portal and to whom those files should be emailed. This information is made available, and potentially persisted on, the secure file transfer system instance 100", e.g., as file distribution data 306. Once Company C, using the client device 302, indicates that the data is ready to be transmitted, the email notification module 108 reads the file distribution data 306 and sends a secure file download link to the intended recipients, e.g., operating target recipient devices 304a-304n. This download link may be password protected, have a limited number of downloads (e.g., on a per recipient basis) defined at send time, have an expiration date, and/or other restrictions. An example restriction is that the recipient must have an account with the secure file transfer system and be logged in to a valid portal to open the download link. Another example restriction is that the recipient must be within a certain IP address range. In other example embodiments, download links may simply facilitate the secure sending of files, without the recipient being required to have an account. In general, these restrictions may be set forth in the file distribution data 306 and/or the Company C account information 116c, and access controls may be enforced through the access control layer 112. Although the data accessible by the target recipients 304a-304n may reside as the Company C shared data 114c', it will be appreciated that the download links provided to the different users may restrict which recipients see which data. This example scenario may be useful in, for example, a bank or mortgage lender transmitting account statements, etc.

Figure 4:
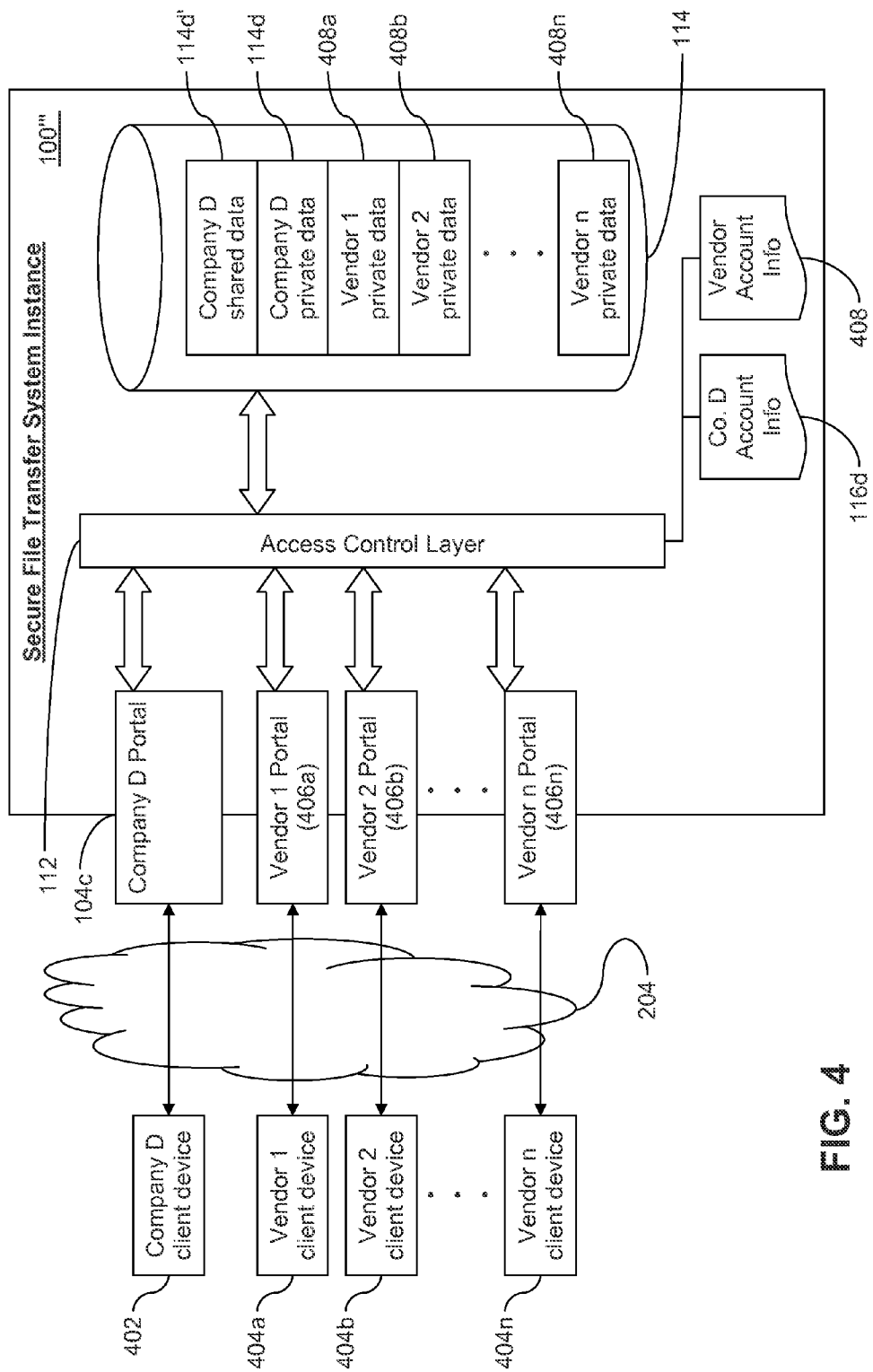
FIG. 4 is a block diagram of an instance of the secure file transfer system of FIG. 1 that helps demonstrate a third example use case, in accordance with an example embodiment.

FIG. 4 is a block diagram of an instance of the secure file transfer system of FIG. 1 that helps demonstrate a third example use case, in accordance with an example embodiment. In this example use case, Company D has a plurality of vendors it needs to send sensitive data to and receive sensitive data from. Company D therefore opens an account with the secure file transfer system, and a secure file transfer system instance 100''' is created together with a portal 104c for Company D and Company D's client device 402. Company D's account information 116d is saved, and vendor account information 408 is defined by company D for its vendors within the system. The definition process results in portals 406a-406n being generated so that the n vendors can interface (e.g., send data to/receive data from) the data in the data store 114 in the instance 100''' using their devices 404a-404n. Thus, separate portals 404a-404n and limited access user accounts for each vendor are created. The vendors can only see files they have access to. In certain example embodiments, this may mean that they can only see their own respective private data storage areas 408a-408n and Company D's shared data 114d'. By default, the vendors cannot see each others' data, or Company D's private data 114d. Files may be sent back and forth to the system instance 100''' via the portals, as potentially facilitated using optional email notifications, etc.

Figure 5:
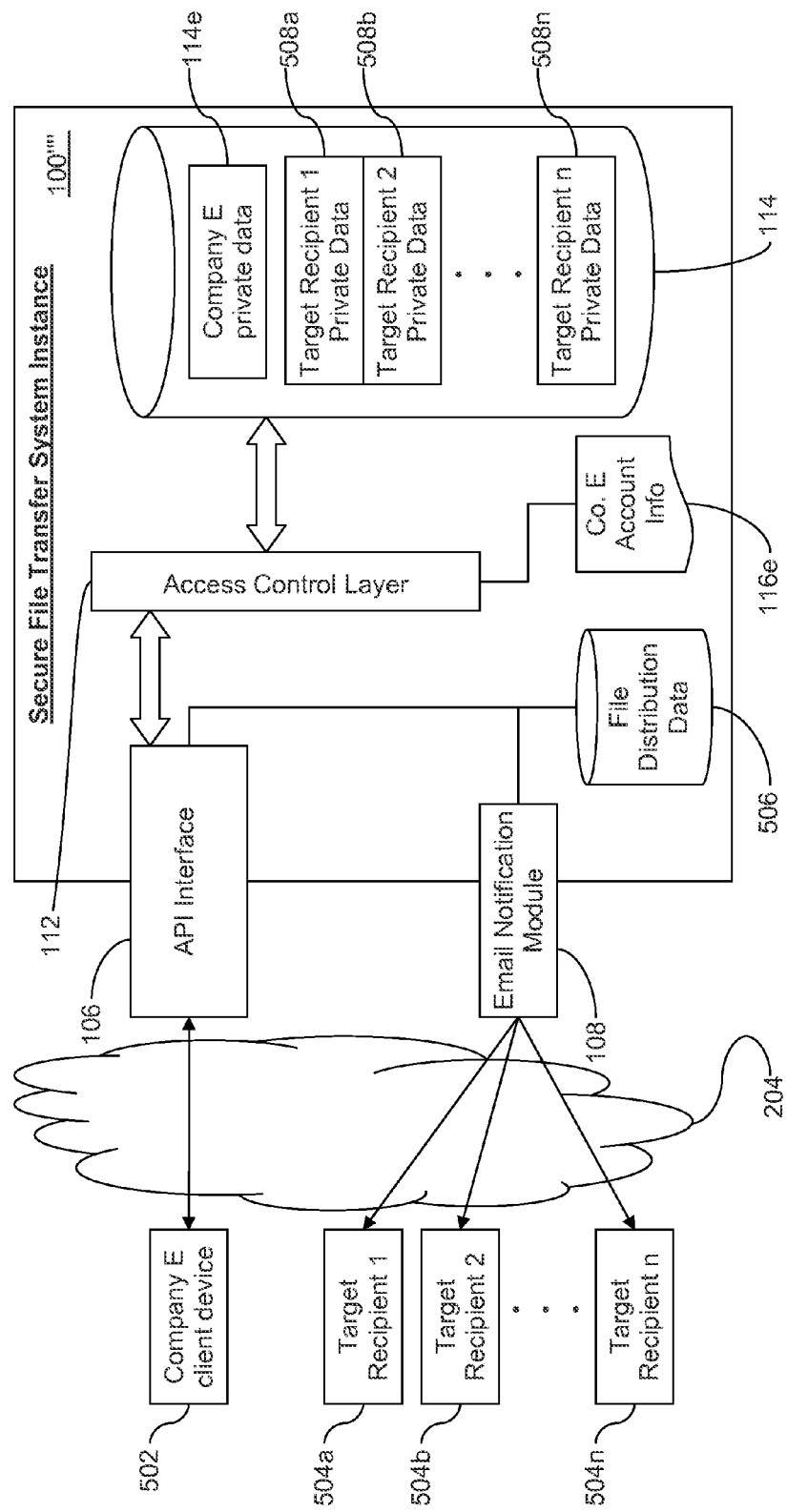
FIG. 5 is a block diagram of an instance of the secure file transfer system of FIG. 1 that helps demonstrate a fourth example use case, in accordance with an example embodiment.

FIG. 5 is a block diagram of an instance of the secure file transfer system of FIG. 1 that helps demonstrate a fourth example use case, in accordance with an example embodiment. In the FIG. 5 example use case, an assumption is made that software developers and/or integrators want to build software to securely send sensitive data (for example, mortgage information) directly from their own systems. These companies can use the API interface 106 of a fourth secure file transfer system instance 100'''' to send files directly out of these systems using their credentials as account holders. For instance, as shown in FIG. 5, Company E has account information 116e that enables it to access use the API interface 106 to access its private data 114e and define distribution data 506 (which may be provided to the system or stored locally on the company E client device 502 or elsewhere). The distribution data 506 may indicate target recipient devices 504a-504n to which private data 508-a-508n for each respective recipient should be transmitted or otherwise made available.

Although certain example embodiments thus far have been discussed in terms of "sending" or "transmitting" files, as will be described in greater detail below, this terminology in at least some example instances is "shorthand" for how files are actually transferred or accessed by end devices. That is, in certain example embodiments, files may be stored to a portion of the data store 114 and made accessible through a defined portal or the like, through a direct download link, via direct integration with a software package implementing portions of the API for interacting with the secure file transfer system and in communication with the API interface 106, etc.

Internal users (e.g., users who have direct accounts with the secure file transfer system) may upload files through a defined portal, through the API interface 106 (e.g., using a suitably configured program or the like), etc. Similarly, external users (e.g., members of sub-accounts) who have access to a portal can login through their portal (e.g., their sub-account portal) to upload files that can be picked up by internal users and/or other external users.

In certain example embodiments, the data store 114 may maintain a logical file structure, e.g., creating at least the appearance of folders, subfolders, and/or the like. Uploaded information can be correspondingly organized. Folders and/or subfolders may be given different access permissions specifying, for example, whether uploads, downloads, objection modifications, and/or the like, are permitted. These permissions may be set by the account's admin user, an external admin user, and/or the like, as appropriate for the implementation.

An electronic notification with an optional download link may be sent to the intended recipient to inform the intended recipient that there is a file waiting for pickup. Electronic notifications may inform the intended recipients that files have been "sent to" (or at least made available for) them. Electronic notifications may be in the form of email messages, text messages, pop-up or other indications sent through the API interface 106, and/or the like, and they may be sent to secure file transfer system account holders to non-account holders.

For account holders, notifications may be processed through email or the like, but in some instances may require successful login to a portal to retrieve the data. For email notifications to non-account holders, notifications may be processed through email or the like, but may require passwords and/or other controls that are not necessarily processed through a dedicated portal. In other cases, a non-account holder may be prompted to create an account to access a file.

A sender optionally may specify to whom the file should be sent, whether and/or how the user should be notified (e.g., via email notification, API interface notification, no dedicated notification at all), whether to password protect files, whether to apply "expiration" timing to a download link and/or the data itself (and, if so, optionally what the expiration date and/or time should be in absolute or relative terms), whether to apply a maximum number of times the file can be downloaded (and, if so, optionally what the maximum should be), whether and which IP blocks and/or addresses the file can be downloaded to, and/or the like. In certain example embodiments, these and/or other options may have minimum or forced settings defined by an admin user. In cases where a minimum is set by an admin user, further security details may be specified at the time of sending.

These and/or other parameters may be defined when data is ready to be sent, as default parameters to be used at a predefined time (e.g., on a successful upload, at a predetermined time interval such as daily, weekly, monthly, etc.), and/or upon user triggers.

It will be appreciated from the above that notifications may be sent automatically or manually (e.g., based on a specific user action). Parameters may be set, for example, to automatically notify users when files are uploaded, when files are uploaded to a specific folder or sub-folder, at a specific time (e.g., for daily status updates, monthly invoices, quarterly account statements, etc.), and/or the like. It will be appreciated that automatic notifications may be generated in addition to, or in place of, manual notifications.

An account holder may specify its own preferred contact information (e.g., email address, phone number to which SMS messages should be sent, etc.) in certain example implementations. In certain implementations, when an account holder sets up a sub-account, it may provide an initial contact address that may or may not be changed by the sub-account holder. In some cases, it may be possible for account holders to request digested reported (e.g., daily reports, weekly reports, etc.) of uploaded information.

Figure 6:
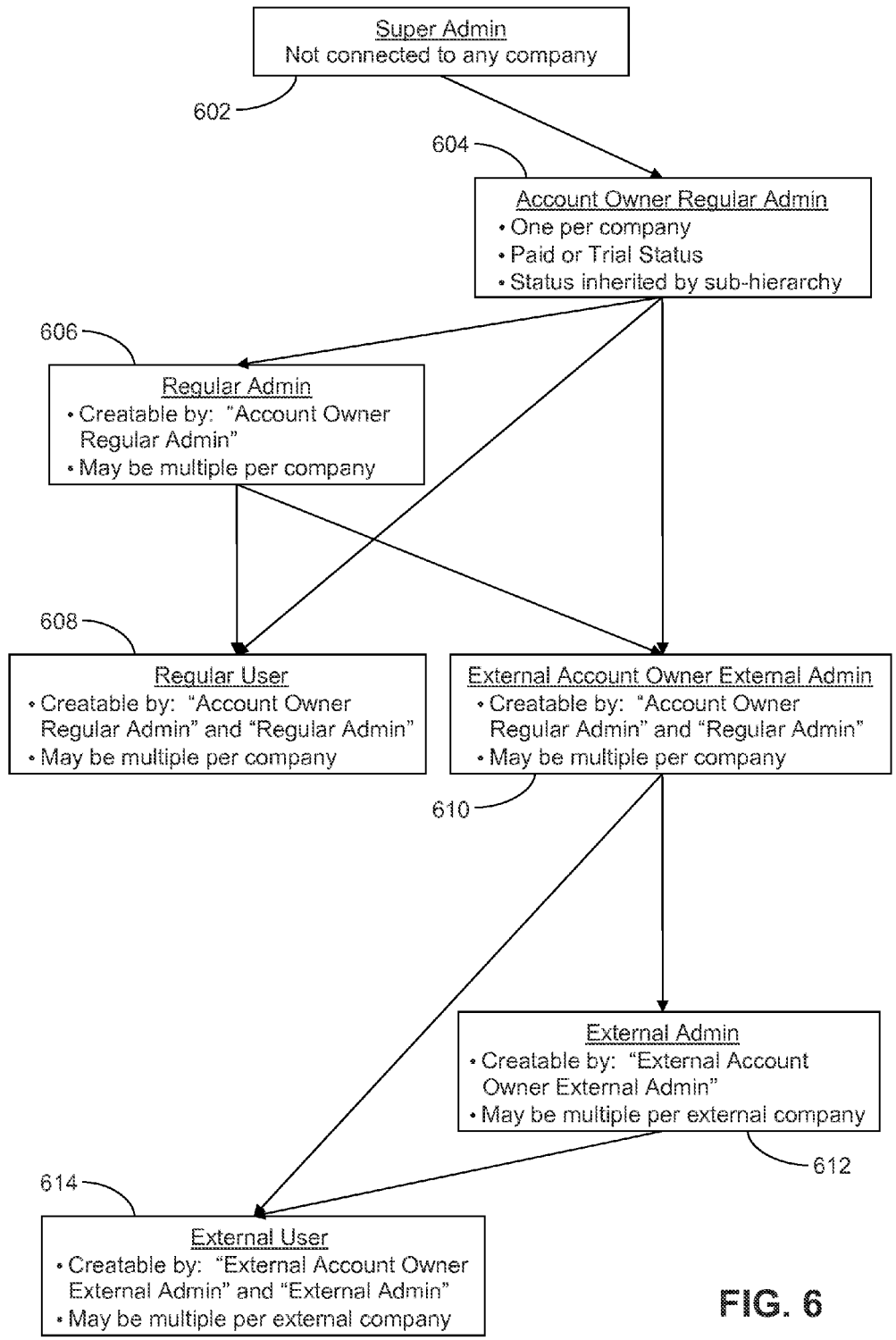
FIG. 6 is an organization diagram showing an example hierarchy of user roles that may be used in an example embodiment.

As alluded to above, multiple user roles may be defined within the secure file transfer system. In this regard, FIG. 6 is an organization diagram showing an example hierarchy of user roles that may be used in certain example embodiments. A super admin user role 602 is not connected to any company and instead represents a non-customer account for the proprietor of the main file transfer system itself. The super admin user account need not necessarily provide access to customer data. It may, however, provide access to system-wide administration and reporting functionality, e.g., to determine system resource utilization as a whole (e.g., for health checks of the overall system) and/or on an account level (e.g., for payment purposes), potential abuses, auditing, and/or other aspects of potential relevance to the proprietor.

An account owner regular admin role 604 may be created for each customer account, and there may be one account owner regular admin account per company in certain example embodiments. The account owner regular admin role 604 may have a paid or trial status (which will be described in greater detail below), and this status may be inherited by members of its sub-hierarchy. In this latter regard, an account owner regular admin account may create regular admin users 606, regular users 608, and/or external account owner external admin user roles 610.

One or more regular admin users 606 may be provided for a particular company account. A regular admin user 606 may be able to create the same roles as the account owner regular admin role 604. However, a regular admin user 606 may not undertake certain actions that are reserved for the account owner regular admin role 604. For instance, a regular admin may not be able to delete the account of the company, change status from trial to paid (or vice versa), etc.

Regular user accounts 608 belong may be treated as internal parts of a company's operations but have no administrative privileges. For example, a regular user may not be able to add additional users, set up external sub-accounts, change some security parameters (e.g., below a specified minimum and/or away from a locked option), etc. If Company A owns the secure file transfer system account, these users probably work for Company A. Regular users may have access to the portals for download and/or upload operations, e.g., as determined by the regular admin role 606 and/or the account owner regular admin role 604. Different users may have different privileges in these regards, and users may be categorized differently in certain example embodiments to facilitate this functionality. Regular user categorizations and the associated privileges may be saved as a part of a company's account information, e.g., at the secure file transfer system instance, and/or may be embedded in different software packages accessible to them.

When a company defines a vendor, client, contractor, sub-contractor, or other sub-account within its main account, this action in essence creates a sub-account that has its own admin and user hierarchy. An external account owner external admin user 610 owns the sub-account, and the external account owner external admin user 610 and one or more external admin users 612 may help manage an associated sub-account. Both can create external users within the sub-account.

In accordance with the explanation of sub-accounts provided above, an external regular user 614 falls under the external admin user accounts 612 of the sub-account user hierarchy. Although there is only one external account owner external admin user 610, there may be multiple external admin users 612 and/or multiple external regular users 614. Restrictions may be placed on the external admin role 612 by the external account owner external admin user 610, and both the external account owner external admin user 610 and the external admin role 612 may place restrictions on the external user role 614. These rights, roles, and privileges may be similar to the discussion provided above in connection with the "regular" or "main" account. However, in certain example embodiments, a "regular" or "main" account admin 606 or account owner regular admin 604 may provide security settings that affect even sub-accounts.

Thus, it will be appreciated that certain example embodiments permit an account's admin user(s) to create and manage regular users of their own accounts and all users of sub-accounts, while also defining the external admin users that manage the sub-accounts. In so doing, as alluded to above, the admin user(s) of an account may be able to set security measures for the sub-accounts that cannot be overridden by external admin users. These measures may include, for example, the ability to add external regular users, the need for multi-factor authentication and/or the type of multi-factor authentication to be used, password rules, forced destruction dates/timeframes, forced download limitations on files sent, and/or the like.

As indicated above, certain accounts may be paid accounts and other accounts may be trial accounts. Certain example embodiments thus may accept credit card payments and, if proper authorization is provided by an account holder, initiate auto-billing and/or auto-crediting on a monthly or otherwise agreed schedule. Pricing may be based on overall storage used, with different tiers paying different amounts. For instance, paid accounts may provide up to 100 GB, up to 1 TB, up to 2-3 TB, etc. Defined levels may be set at any number of tiers that are evenly or not evenly incremented. For instance, levels may be set at 100 GB, 500 GB, 1 TB, 5 TB, and 10 TB levels, although it will be appreciated that these are just examples. Alternatively, or in addition, pricing may be based on the number of client devices needing access to the system, including (in at least some implementations) the number of client devices of any created sub-accounts. For example, accounts meeting or exceeding a predetermined number of client device connections (e.g., 10, 30, 50, 100, etc.) may be charged a premium. In certain example embodiments, credit card and/or other payment information may be maintained for clients. In addition, or in the alternative, certain clients may be provided with more "traditional" invoicing, e.g., with Net 30 terms (where an invoice is sent, and the client can wait up to 30 days before making payment by check or the like). This latter approach may be desirable, e.g., if the client is large, brings in enough revenue, etc. Lines may be drawn as appropriate in different example implementations.

Super admin users may be able to change payment terms for customers, provided that they agree. As alluded to above, pricing may be based on a default base price for each tier of storage, and being able to change the payment terms as storage utilization increases may be desirable. In certain example embodiments, this may be performed automatically, e.g., as the system scales up to accommodate additional data, as the system scales up and remains above the next threshold for at least a predefined time period, etc. In other cases, a super admin user may be automatically notified that a change might need to be made so that the super admin user has the chance to contact the account owner regular admin. It may in certain example embodiments also be desirable to apply temporary discounts (for instance, by percentage and/or by dollar amount, e.g., for a user-definable number of months or other length of time), to credit dollar amounts to their accounts, etc.

Figure 7:
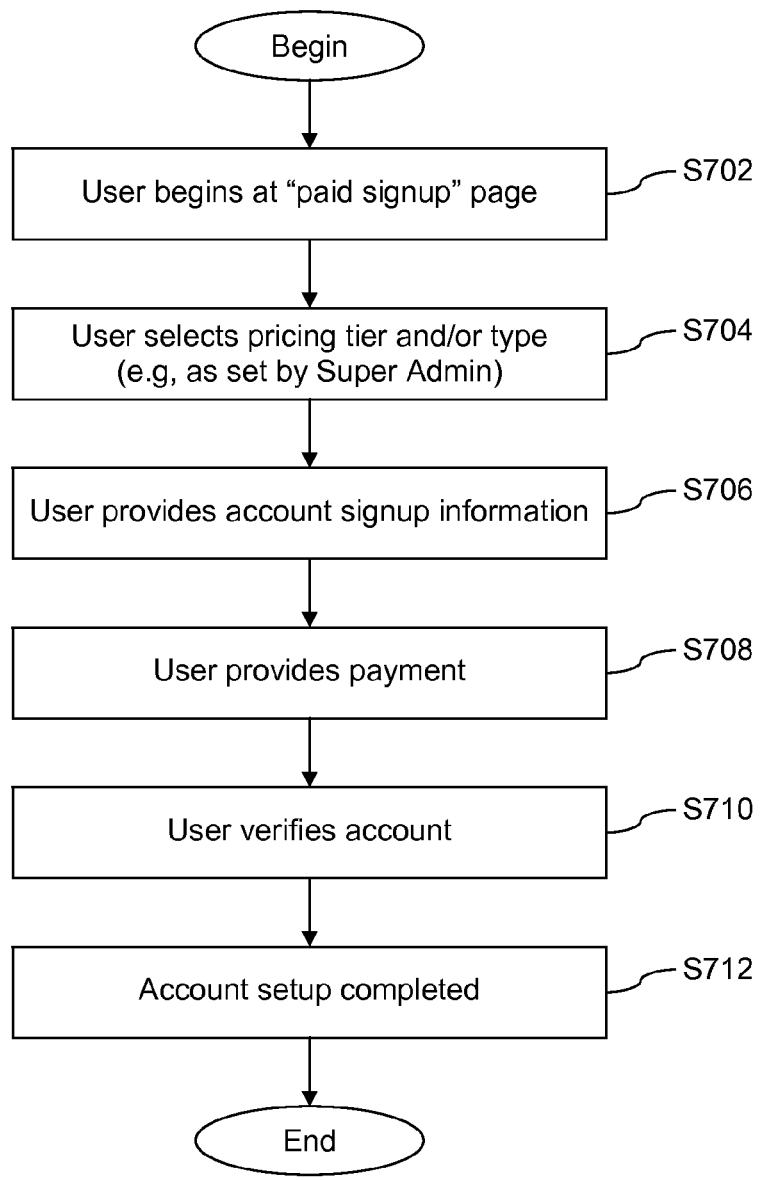
FIG. 7 is a flowchart showing an illustrative paid account signup method, in accordance with an example embodiment.

Example signup processes will now be described in connection with FIGS. 7-9. First, FIG. 7 is a flowchart showing an illustrative paid account signup method, in accordance with an example embodiment. The user begins at a "paid signup" page in step S702. In step S704, the user selects a pricing tier and/or type (e.g., based on a range of possible selections having different prices and scopes established by the super admin user, as discussed above). In an example embodiment, four pricing tiers are made available, and the tiers may be priced so as to have different effective amounts if user signs up for a monthly account with no minimum commitment versus a monthly account with a one-year subscription (with the latter being less expensive on an annualized basis). Both options may trigger automatic monthly billing, until the user cancels the subscription.

In step S706, the user provides account signup information. This may include, for example, the account owner's name, email address, company or other organization name, company or other identifier, job title, phone number, company URL, company size, and/or the like. It will be appreciated that any unique identifier can be used as an organization's "username" throughout the site. For example, AT&T might use "ATT," the University of Connecticut might use "UCONN," etc. The user provides payment in step S708 (e.g., via a credit card processed through a centralized clearinghouse or the like). This may trigger a verification to be sent to the user, and the user may verify the account in step S710 (e.g., by clicking a link in an email, entering a verification code provided with the email, and/or the like). In certain example embodiments, the notification that is sent is similar to the notifications described above, e.g., in terms of being sent through the email notification module, having a similar look and feel, etc. Basic account setup is now completed in step S712, and the user is considered the account owner regular admin.

Figure 8:
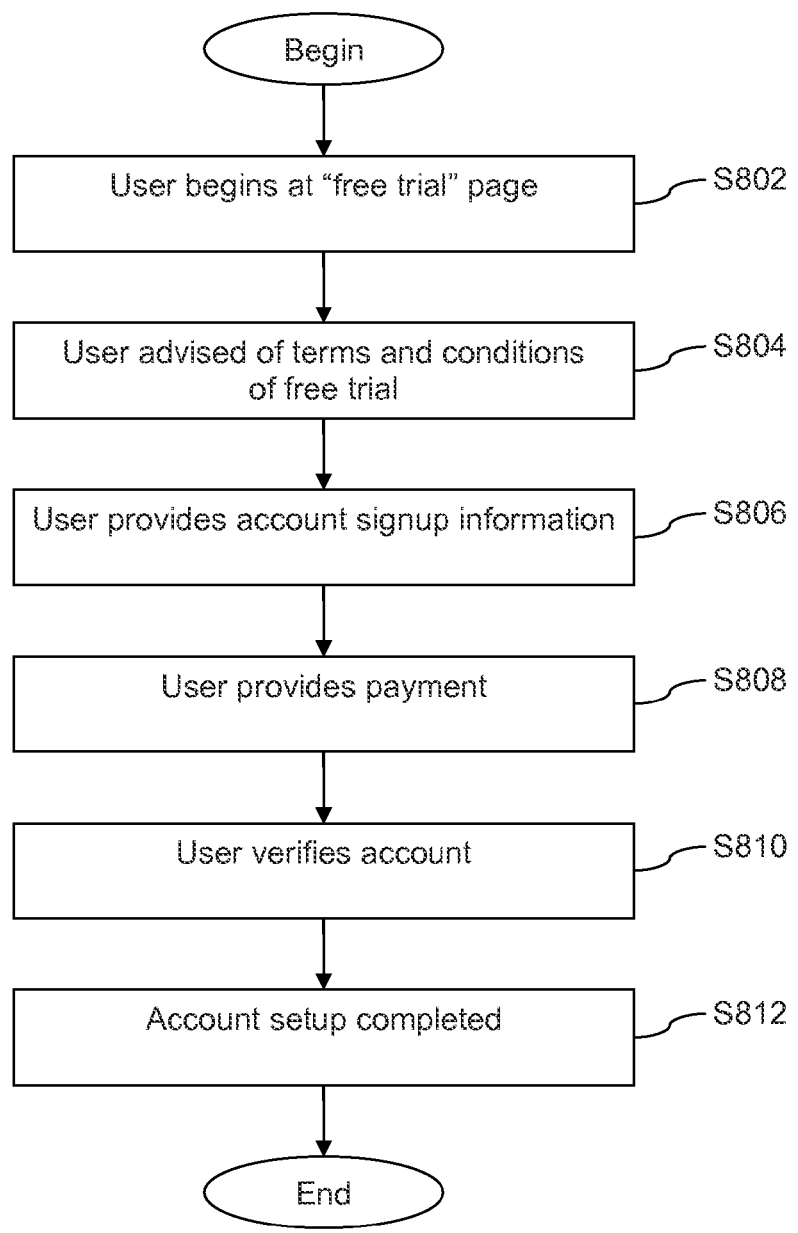
FIG. 8 is a flowchart showing an illustrative trial account signup method, in accordance with an example embodiment.

FIG. 8 is similar to FIG. 7, except that FIG. 8 is a flowchart showing an illustrative trial account signup method, in accordance with an example embodiment. In step S802, the user begins at the "free trial signup" page. In step S804, the user is advised of the terms and conditions associated with the free trial. For instance, the user may be told that the account will work for only a predefined time period (e.g., 30 days) before requiring payment or being locked until payment is made. Step S806, S808, S810, and S812 are similar to steps S706, S708, S710, and S712 described above. The user, for instance, have to provide credit card information, even though the trial is free. In certain example embodiments, file storage space and/or file size limitations may be imposed for trial account users. For instance, the size allotment may be fixed at 150 MB. In certain example embodiments, the space allocation, file size limitation, length of the trial, and/or the like, may be overridden by the super admin user. In certain example embodiments, default values for those and/or other parameters may be set by the super admin user.

Figure 9:
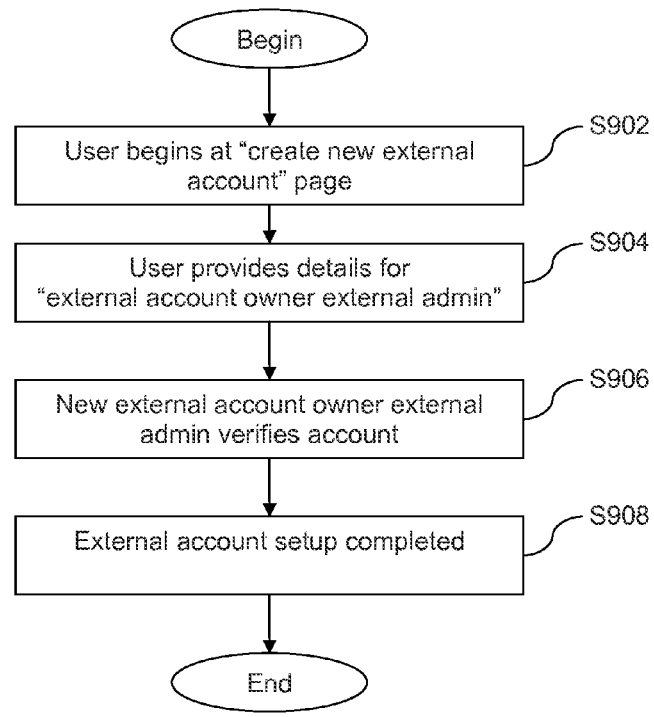
FIG. 9 is a flowchart showing an illustrative external account signup method, in accordance with an example embodiment.

FIG. 9 is a flowchart showing an illustrative external account signup method, in accordance with an example embodiment. In step S902, a user begins at a "create new external account" page. The user may be required to have admin privileges to take such actions, e.g., as implied by the FIG. 6 example hierarchy diagram. In step S904, the user provides details for the "external account owner external admin" user. This information may include, for example, the external admin user's name, email address, job title, company name, company URL, and/or the like. This may trigger a verification message to be sent to the proposed external account owner external admin user, e.g., similar to as described above. Once the new external account owner external admin user verifies the sub-account in step S906, account setup is completed in step S908 and the external account owner external admin user can begin using the system through its own portal or the like.

A series of example screenshots are provided in FIGS. 10-37, and the contents of each will be described in detail below. Those skilled in the art will understand the user interface elements that may be used in these figures, as well as how they may be programmed and incorporated into instructions that, when executed or interpreted by a processor, perform the functions that would be expected. In addition, the functionality of these example screens will be understood by those skilled in the art, and the following descriptions are provided by way of emphasis. It also will be appreciated that other arrangements of some or all the information provided on these example screens (and/or other information) may be used in different example embodiments.

Figure 10:
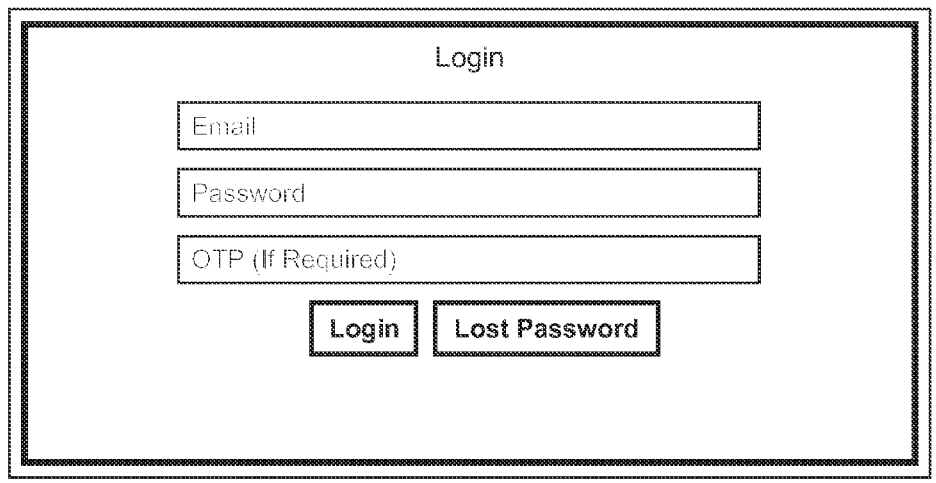
FIG. 10 is an example login screen in accordance with an example embodiment.

FIG. 10 is an example login screen in accordance an example embodiment. Each account user (e.g., each company, organization, enterprise, etc.) may have its own login portal to keep user credentials walled off from other account users. This arrangement also enables individuals to assume different roles in different organizations. For instance, an individual could be an admin for one company and an outside user for another company, with no shared resources between the two companies. The login URL may help differentiate different companies. For instance, the URLs app.ethersend.com/northeasternllc and app.ethersend.com/aitheras will take users to login portals for Northeastern and AITHERAS, respectively. Login credentials do not work between portals in certain example embodiments. In other example embodiments, the entry of a username and password may be sufficient to provide access to the proper portal, even though a common URL is used. In other cases, where a user has access to multiple accounts, the user may select or otherwise specify the particular account portal to log into as a part of the login process (e.g., when providing username/password information, in response to successful initial credentialing via username/password information, etc.). A dedicated area for a one-time password (OTP), if required, is also presented. An OTP might be entered automatically in certain example embodiments, e.g., as a result of a user inserting a hardware device (e.g., of the type provided by Yubikey or others) into a local machine, and this and/or other OTP types may be used as a 2FA or other solution. This arrangement may in certain example embodiments help increase security by making it so that the person logging in needs to have the hardware, as well as the credentials, e.g., before gaining access to the system.

Figures 11, 12:
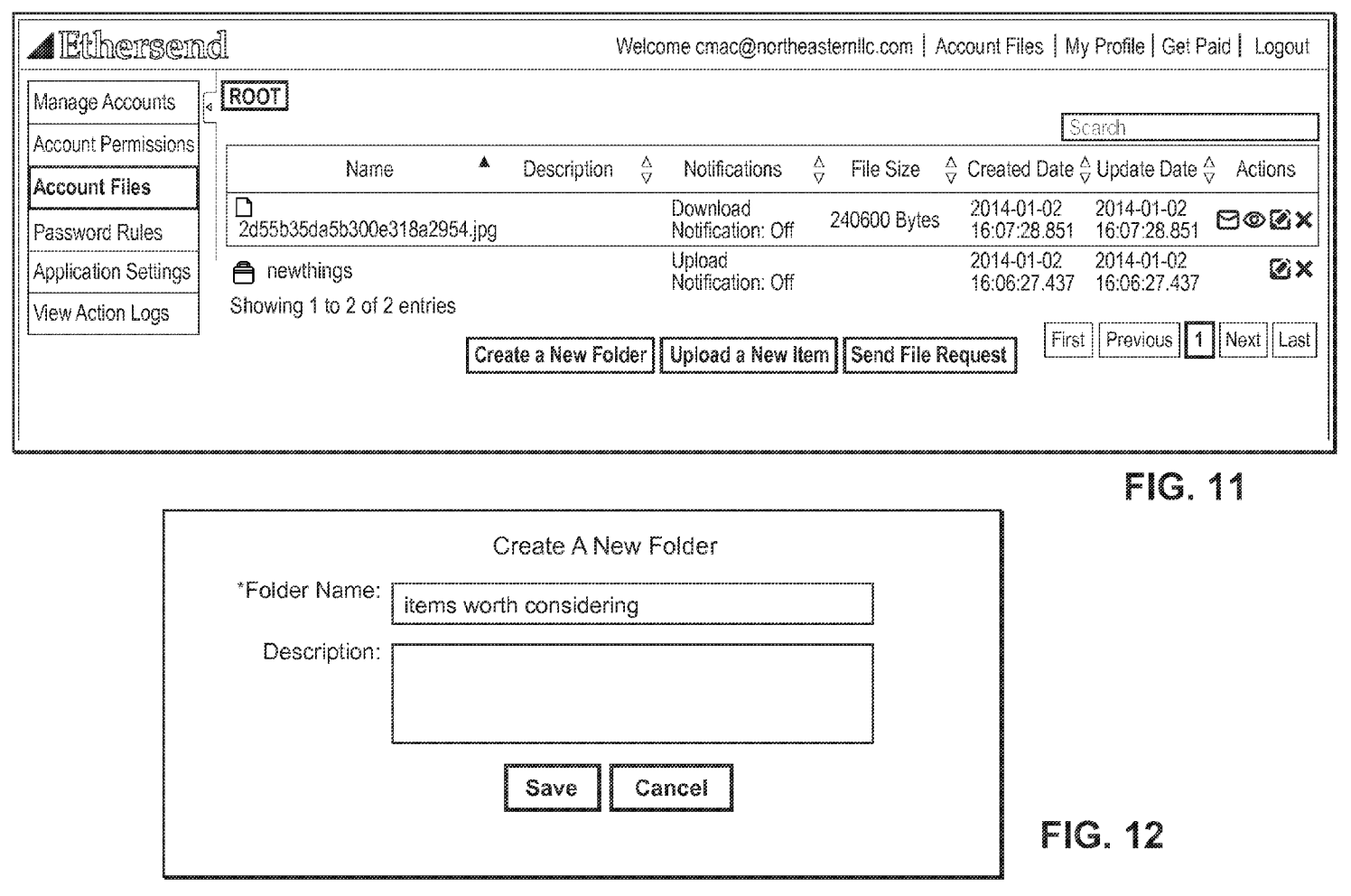

FIG. 11 is an example main view screen in accordance with an example embodiment. The FIG. 11 example main view screen may be the first view presented to the user after a successful login operation. As shown in FIG. 11, it may include a representation of a virtual file structure of the backend data store. File names, descriptions, file sizes, created and updated timestamps, etc., are provided for each object (as appropriate). Indications as to whether upload and/or download notifications are activated also are shown on an individual object level. Icons enabling users to transmit, view, edit, and delete individual items also are shown in registration with those entries. Paging controls also are included in the event that there are many objects that do not fit conveniently on display screen. Dedicated options for creating a new folder, uploading a new item, and sending a file request are provided. Each of these operations will be discussed, in turn, below.

FIG. 12 is an example screen for creating a new folder in accordance with an example embodiment. Filling out this dialog will create a new directory (or sub-directory) underneath the current location in the virtual file structure. An optional description may be provided, in addition to the required folder name.

Figure 13:
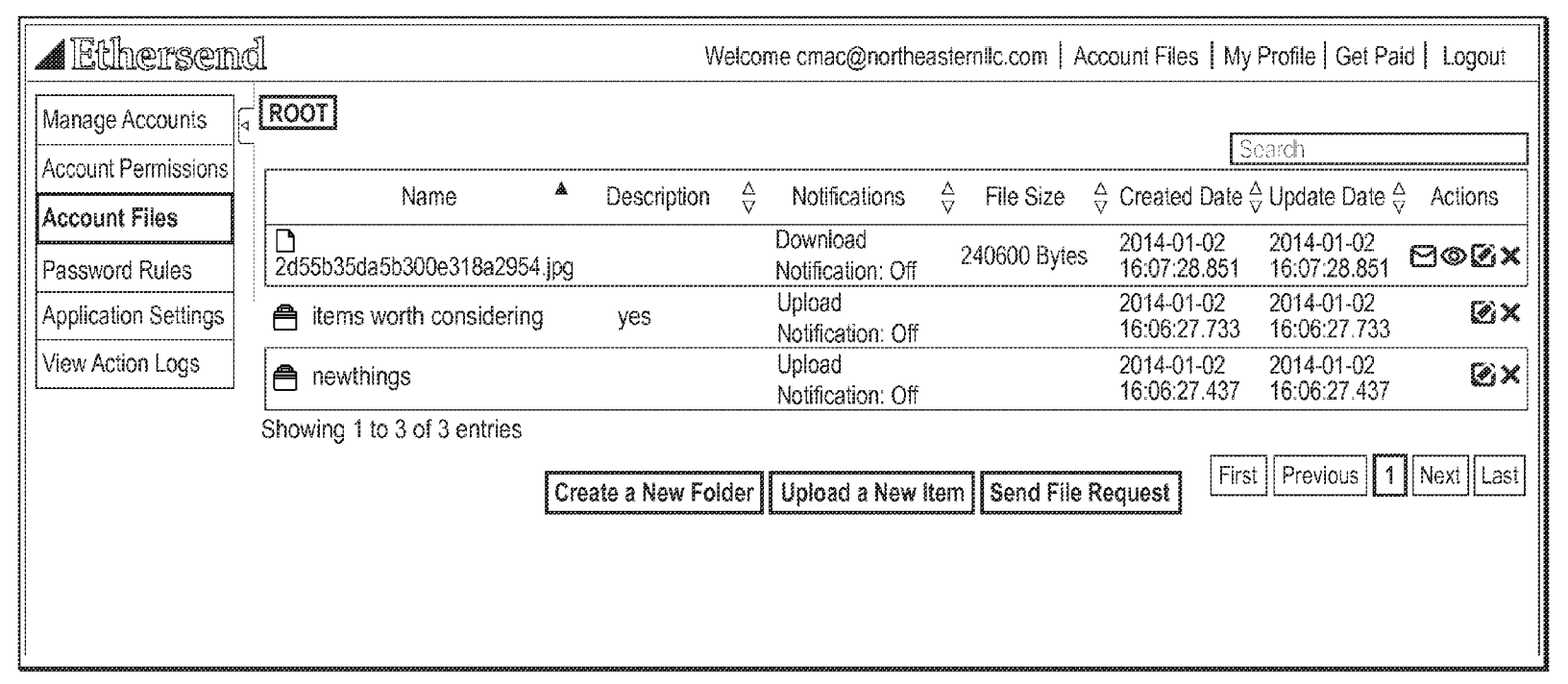

FIG. 13 is an example update to the screen of FIG. 11, following the creation of a folder using the FIG. 12 example screen and scenario posited therein. In other words, once the "save" button is pressed in the example create a new folder dialog of FIG. 12, the folder is created in the virtual file system.

FIG. 14 is an example screen enabling the uploading of new items, in accordance with an example embodiment. The FIG. 14 example dialog is activated once the corresponding button is pressed in FIG. 11 or FIG. 13. A user may access an OS dialog to select a file to upload by pressing the "upload a file" button. Optionally, an item name and/or description may be provided. In certain example embodiments, functionality may be implemented for batch uploads (e.g., uploads of more than one file at a time). Furthermore, in certain example embodiments, uploads of one or more items may be scheduled, e.g., to occur automatically at a certain time and/or date, with an optional recurrence (e.g., for data archiving, automatic status updating, and/or other purposes, etc.).

Saving a file from FIG. 14 will trigger an upload (e.g., an AJAX upload). This may cause a color-coded indication of whether the item upload process was successful (e.g., green means a success, yellow means in process, red means failure, etc.). In certain example embodiments, a progress bar or the like may be implemented to show the percentage of the upload completed, etc. In this regard, FIG. 15 is an example screen showing a successful upload from the FIG. 14 example. As can be seen, a description is provided, and the file has been uploaded. It is noted that the name of the file may be represented with what is typed in the "name" field, with the filename of the file, a UUID, a GUID, and/or other identifying information that might be meaningful to a user. In certain example implementations, the filename may be renamed or otherwise aliased, e.g., as between different users (for ease of reference and/or the like).

FIG. 16 is an example screen showing password rule configuration, in accordance with an example embodiment. The FIG. 16 example screen may be accessed by selecting the corresponding option at the left side of FIG. 11 or FIG. 13. No rules are shown in FIG. 16, but FIG. 17 is an example screen showing how new password rules may be setup in accordance with an example embodiment. The password rule may be given a name, and optional parameters include (at least in this example), minimum and/or maximum lengths; how many letters, numbers, and/or special characters must be provided; how often a password must be reset; whether multi-factor authentication is enabled; and whether the password is active. Of course, these and/or other options may be used in different example embodiments.

FIG. 18 is an example screen showing how applications setting may be specified in accordance with an example embodiment. The FIG. 18 example screen may be accessed by selecting the corresponding option at the left side of FIG. 11 or FIG. 13. Admin users may use this screen to set at least some account-wide security settings. Super users may be presented with the same or an expanded set of options, as discussed in greater detail below. In the FIG. 18 example, settings are provided for enabling limitations to be set on a maximum number of downloads for any given item, forcing destruction of a data after a certain time (e.g., so that data tends to not linger and become a potential liability in terms of space utilization, maintenance of secure or private content, etc.), and establishing account password expiry timeframes.

Figures 19, 20:
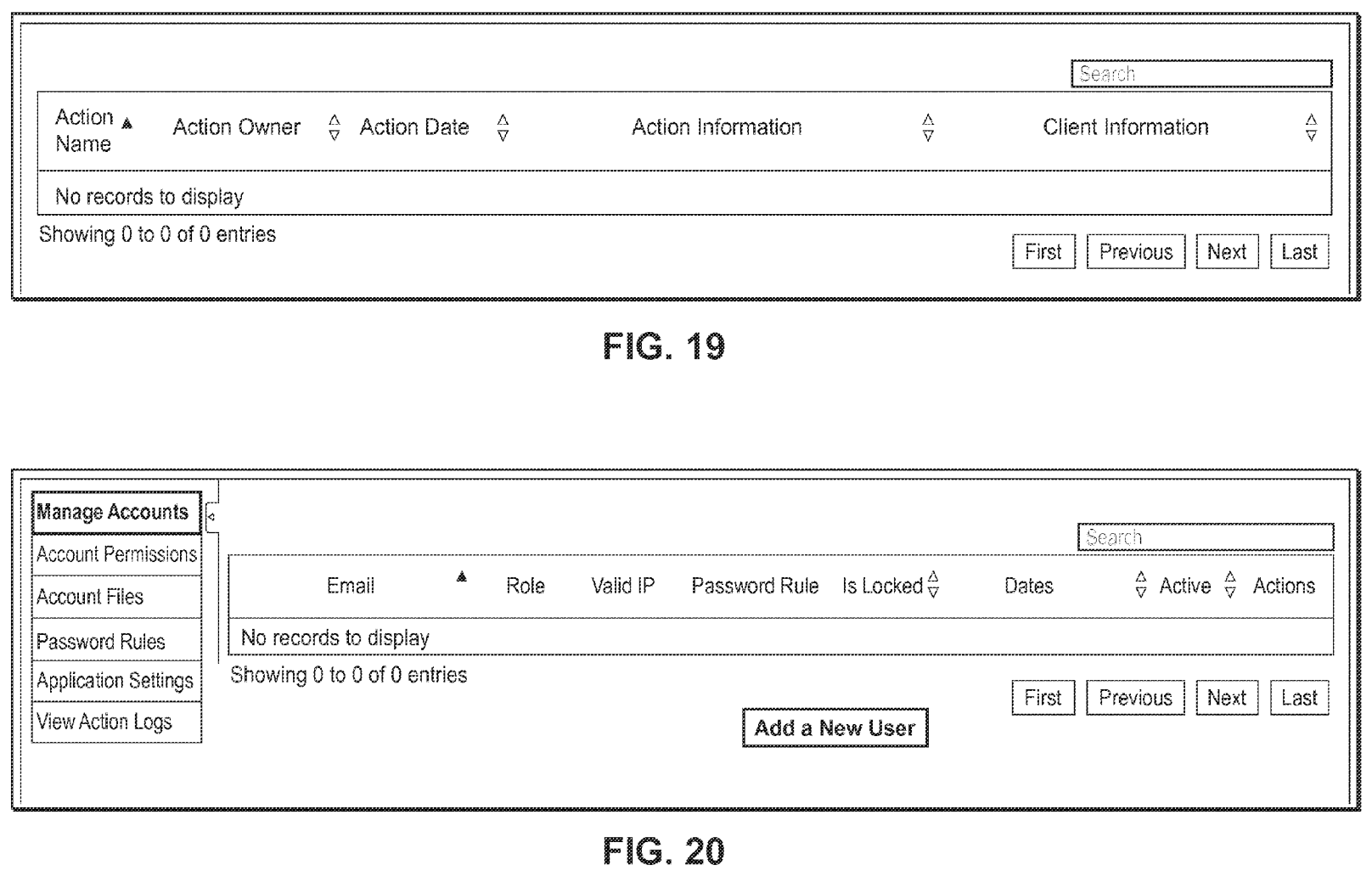

FIG. 19 is an example action log screen that may be used with an example embodiment. As indicated above, audit trails may be maintained, and the FIG. 19 example screen may be used to show historical information. In that regard, historical information may be filtered by action, actor, time and/or date, account or sub-account, and/or the like. Multiple selections and/or range selections may be used for filtering purposes, as well. A learning system may be implemented, e.g., to flag suspicious, abusive, and/or other activities.

FIG. 20 is an example screen enabling a user to manage accounts, in accordance with an example embodiment. Using the FIG. 20 example screen, a user may add, edit, delete, or otherwise modify accounts (provided the hierarchical privileges exist). This may include both internal accounts, as well as sub-accounts (e.g., defined for contractors, sub-contractors, vendors, and/or other persons). FIG. 20 may, for each user, list information such as, for example, email address, role(s) in the hierarchy, active or logged in status, recent actions taken, password rules, valid IP address listings, and/or the like.

FIG. 21 is an example screen for adding new users in accordance with an example embodiment. FIG. 21 may be reached by pressing the appropriate button from FIG. 20. An email address may be required, although additional information such as, for example, password expiry date, account expiry date, role, password rule to which the user will have to adhere, a valid IP address or address range, etc., may be provided. It is noted that the "lock" and "active" options might be used as checkboxes, radio buttons, and/or the like, e.g., to accomplish the same or similar functionality. That is, they may in certain example instances be used to lock a user out of an account. The lock-out functionality may be performed manually (e.g., with the checkbox), a predefined number of security breaches and/or failed logins might automatically trigger a lock-out, etc.

When the "role" drop-down in FIG. 21 is selected, the list shown in FIG. 22 may be displayed. From that list, the new user's role as an internal or external user may be defined. Other status information (e.g., whether the person is to be an admin, regular user, etc.) may be provided here or elsewhere.

A description of how files may be "sent" will now be provided. The control button in FIG. 23 is depressed, which brings up the FIG. 24 example screen. FIG. 24 is an example screen that may be used for "sending" a file in accordance with an example embodiment. FIG. 24 enables a user to specify one or more users to which the item is to be sent. In the FIG. 24 example, this may be done by providing an email address. It will be appreciated that multiple email addresses may be provided, e.g., to "send" the file to multiple users. In certain example embodiments, email addresses may be selected from an address book or the like, imported from an external listing of email addresses, manually entered, etc. Although the FIG. 24 example has been described in connection with email address distribution, it will be appreciated that certain example embodiments may inform users of files being sent to them in other ways such as, for example, through SMS messages, pop-up or other notifications in an application implementing at least portions of the secure file transfer system's API, by initiating a telephone call, etc. Furthermore, although the FIG. 24 example embodiments involves the sender specifying email addresses, the sender may instead designate target recipients in other ways such as, for example, by specifying a predefined group of users (e.g., all regular users, all users in a selected sub-account, a custom grouping of loosely or tightly linked individuals such as nuclear family members, etc.), by providing file transfer system account names, etc. The specification of users in this may send emails and/or other notifications in line with the above.

FIG. 25 shows portions of the FIG. 24 example screen being filled out, e.g., to specify certain security features, in accordance with an example embodiment. The security features that may be specified in the FIG. 24 and FIG. 25 example include a download expiration date, a maximum number of times the item can be downloaded, and a download password. Users may be prompted to enter the download password twice to ensure that it is accurately entered. The user may also specify an IP address or IP address range of devices through which the users may access the data. Of course, it will be appreciated that these and/or other security features may be provided in different example embodiments. It also will be appreciated that minimum and/or predetermined security requirements may be set by an admin user and thus be required for entry before enabling a user to send the link.

Figure 26:
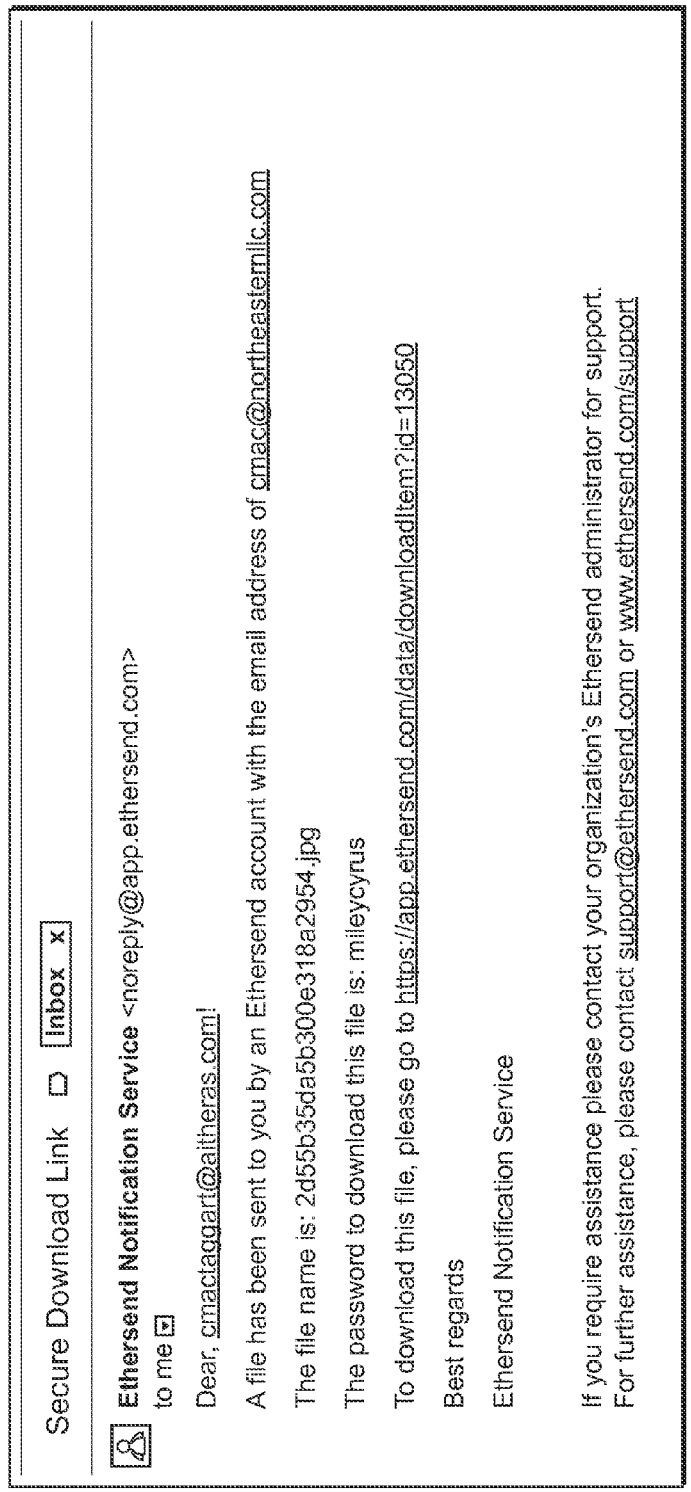
FIG. 26 is an example notification email that may be sent in accordance with an example embodiment.
Figure 27:
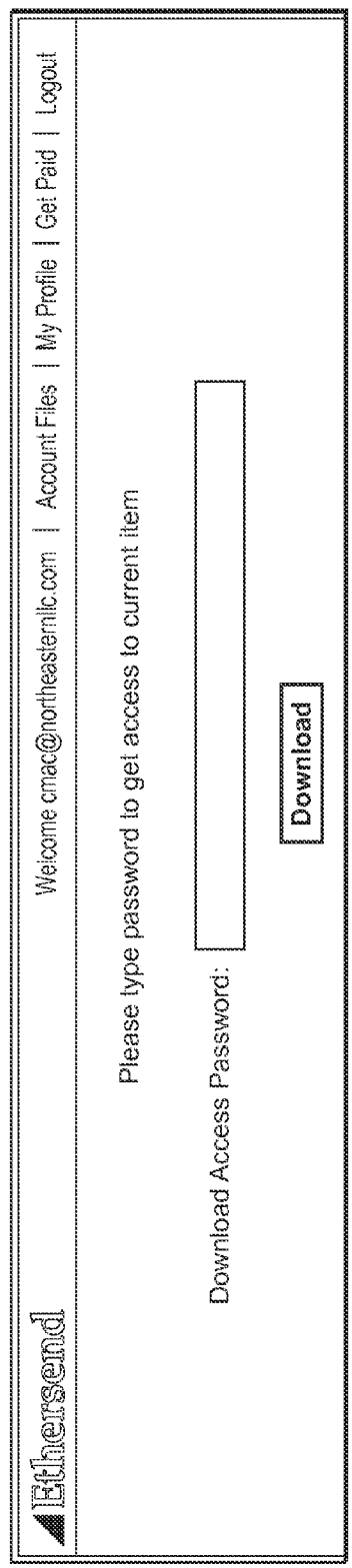
FIG. 27 is an example secure portal download access screen in accordance with an example embodiment.

FIG. 26 is an example notification email that may be sent in accordance with an example embodiment. Standard text is provided in the email, including a welcoming message, an indication of the item that is being transmitted, information as to how to get help, etc. In certain example embodiments, the indication of the item that is being transmitted may be a file name, description entered by the person who uploaded and/or the person who transmitted the item, and/or the like. A secure download link also is provided for the target recipient to click on to receive the file.

In certain example embodiments, the download link may include an argument with a simple counter that points directly to a file. In other example embodiments, a more secure argument may be provided (e.g., to reduce the likelihood of people easily "snooping" for valid links, etc.). One option in this regard is to use arguments that correspond to entries of a table in a database and identify, for example, the custom message blob, filename, and/or other relevant file information. Another option that may be used in certain example embodiments is to use a randomized, hashed, or otherwise difficult to discern key to a table that includes the ultimate storage location. Of course, other techniques may be used in different example embodiments.

In certain example embodiments, the user need not necessarily have an account with the secure file transfer system to access the file. In certain example embodiments, the email message itself may be secured (e.g., by being encrypted, password protected, and/or the like). In other cases, clicking on the link in FIG. 26 may cause the user to navigate to the example secure portal download access screen shown in FIG. 27. The user may be asked to enter a password and/or provide other authenticating information to download the item. In other cases, if the user is required to open a secure file transfer account to access the file, the user may be prompted to complete a new user account signup e-form or the like before accessing the file.

It will be appreciated that the same or similar techniques may be used for distributing files to (1) a plurality of different external users (e.g., in the case of a company using a software package to send, using the API, bank account statements and/or the like), (2) sub-account holders such as sub-contractors or vendors, etc. For instance, account signup techniques, file download notifications, and/or the like, may be the same as or similar to those set forth herein. With respect to an API implementation, a RESTful and/or other service may be used to implement features useful for logging in, uploading/downloading documents, performing account maintenance, etc. The functionality implemented may be keyed to user accounts and/or hierarchical delegations of authority, e.g., so that users are able to interact with only an appropriate subset of files, take appropriate account-related actions, etc. In certain example embodiments, some or all of the following and/or other features may be implemented for all user types:

Login (username, password, OTP, companyUrl);
Logout;
Handling of authentication errors;
Restore password;
Show user profile;
Save user profile;
Show select pricing tier;
Select pricing tier;
Paid signup (e.g., via Amazon or other service);
List files in the selected directory with parameters such as, for example, sorting, filtering, and pagination parameters;
Download item (e.g., with file identification parameters);
Show upload form;
Request file (e.g., with file identification parameters, descriptions, etc.);
Edit file;
Save file;
Upload new file (e.g., with file identification parameters, descriptions, path information, etc.);
Delete file;
Create folder;
Edit folder;
Delete folder; and/or
Send download link to email (e.g., with parameters for email address(es); subject line; header content; message and/or message related string information, etc.).

Some or all of the following and/or other features may be implemented for regular and external admin users:

List all accounts for admin;
Add a new account;
Edit existing account;
Save account;
Delete account;
Show application settings;
Update application settings;
List all password rules;
Edit custom rule;
Delete rule;
Save rule; and/or
Show all action logs.

As indicated above, a user may request an item, e.g., using the main screen of FIG. 11 or FIG. 13. In this regard, FIG. 28 is an example screen that may be used to send a file request in accordance with an example embodiment. As shown in FIG. 28, an account holder can send a message to a party requesting a particular file. The account holder may specify the person(s) of whom the request is to be made, e.g., using the same techniques specified above in connection with specifying person(s) to whom an item is to be transmitted. In the FIG. 28 example, a user may further provide a short description of the item requested, a more detailed message, etc. The user may also specify a location in the user's virtual file structure to which the item should be uploaded, if ultimately provided by the requester. It will be appreciated that non-account holders may use a similar system to request items (such as, for example, account statements, tax documents, project status updates, etc.), e.g., using software that implements at least portions of the API, through a website run by an account holder that implements at least portions of the API, etc.

Figure 29:
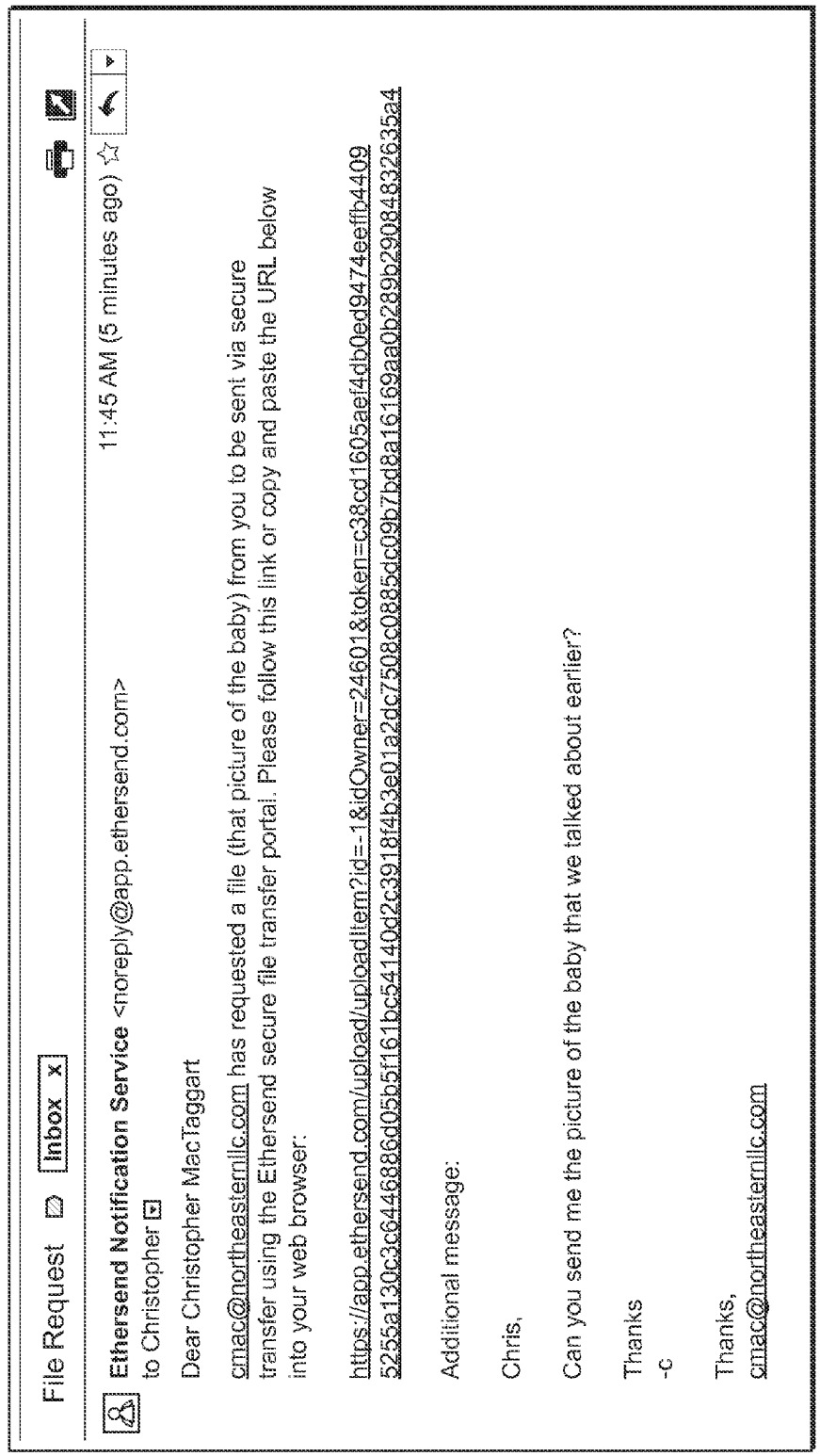
FIG. 29 is an example notification email that may be sent for a requested file, in accordance with an example embodiment.

FIG. 29 is an example notification email that may be sent for a requested file, in accordance with an example embodiment. FIG. 29 is similar to FIG. 26, in that it includes standard text such as, for example, a welcoming message, an indication of the item that is being requested, etc. The custom message may be provided, as well as the short description of the item requested.

It is noted that the uploader need not necessarily be an account holder in certain example embodiments. In those example embodiments, where the user must be an account holder, a login screen similar to that provided above may be provided and/or a user may be prompted to setup a new account. The link provided in the notification may take the user to the appropriate screen, e.g., depending on the example embodiment. In certain example embodiments, the uploading user may be asked to provide some further authenticating information, e.g., to help ensure that the uploader is a person qualified to provide the item requested and not (for example) a malicious user. The information may be some prearranged password, code, information shared between the users, CAPATCHA code included with the notification, etc.

Figures 30, 31:
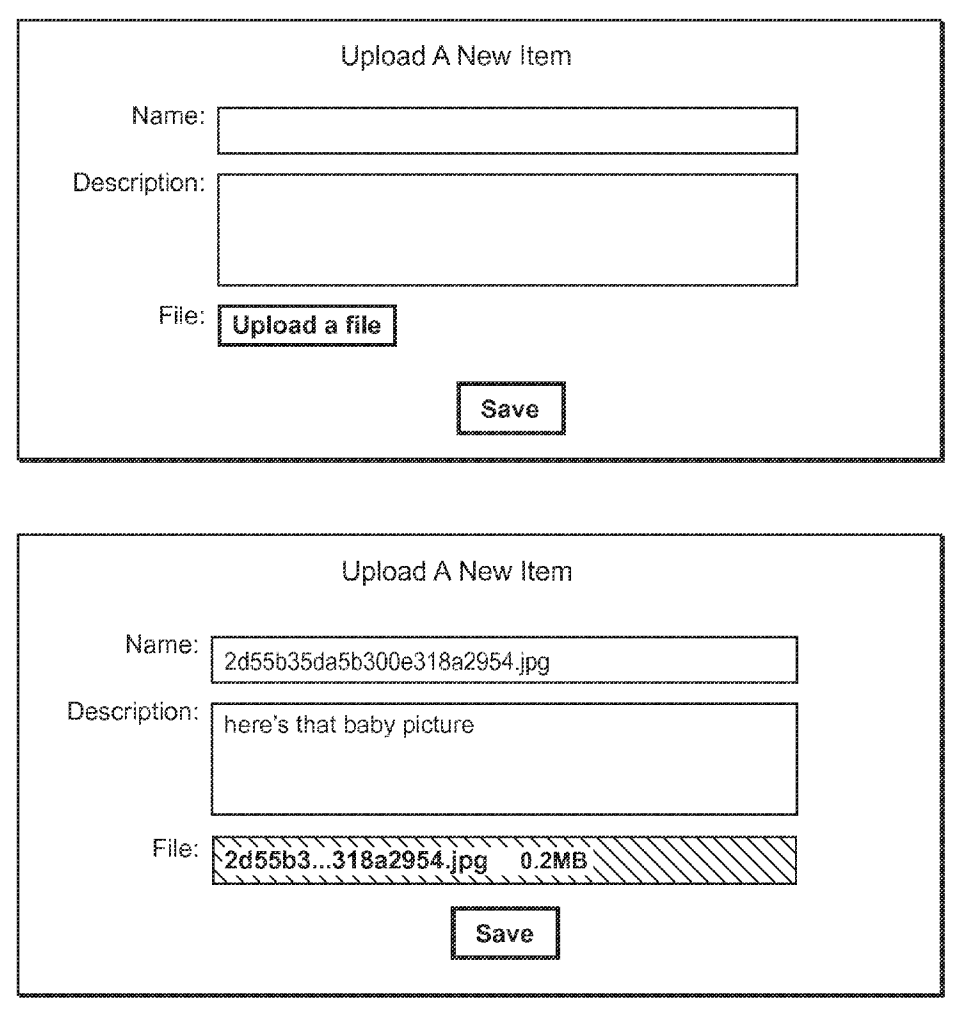

FIG. 30 is an example secure upload dialog box that may be accessed following a selection of the link provided in the FIG. 29 example notification, in accordance with an example embodiment. FIG. 30 shows the secure portal linked to from the email, and it makes it easy for accountholders to obtain information from others, e.g., with the need for a dedicated separate SFTP or other secure client. FIG. 31 shows a successful upload operation using the FIG. 30 example upload screen, in accordance with an example embodiment. The action may be similar to the description provided above in connection with FIG. 14-15, e.g., in that an AJAX or other secure upload technique may be implemented, and a color-coded or other system may be used to show the status of transmission.

Figure 32:
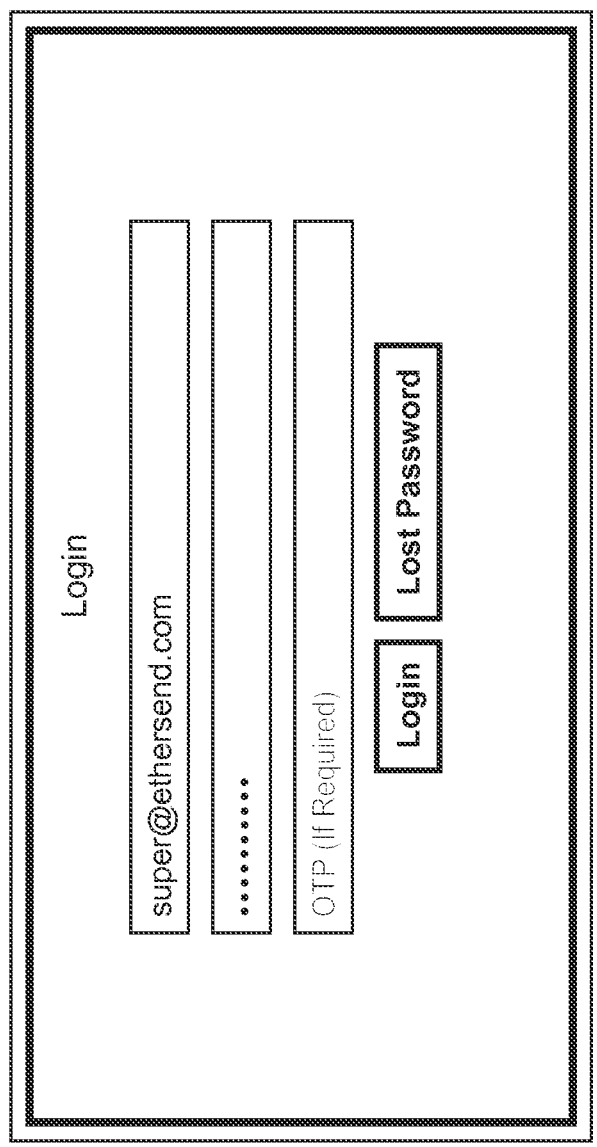
FIG. 32 shows a super admin user logging in using the FIG. 10 example login screen.

A description of exemplary super user functionality will now be provided, e.g., in connection with FIGS. 32-37. First, FIG. 32 shows a super admin user logging in using the FIG. 10 example login screen. Additional authentication requirements may be required for the super admin user, as the super admin user has the most privileges and can, for example, control pricing for all accounts, change user privileges, set global password requirements, etc.

Figure 33:
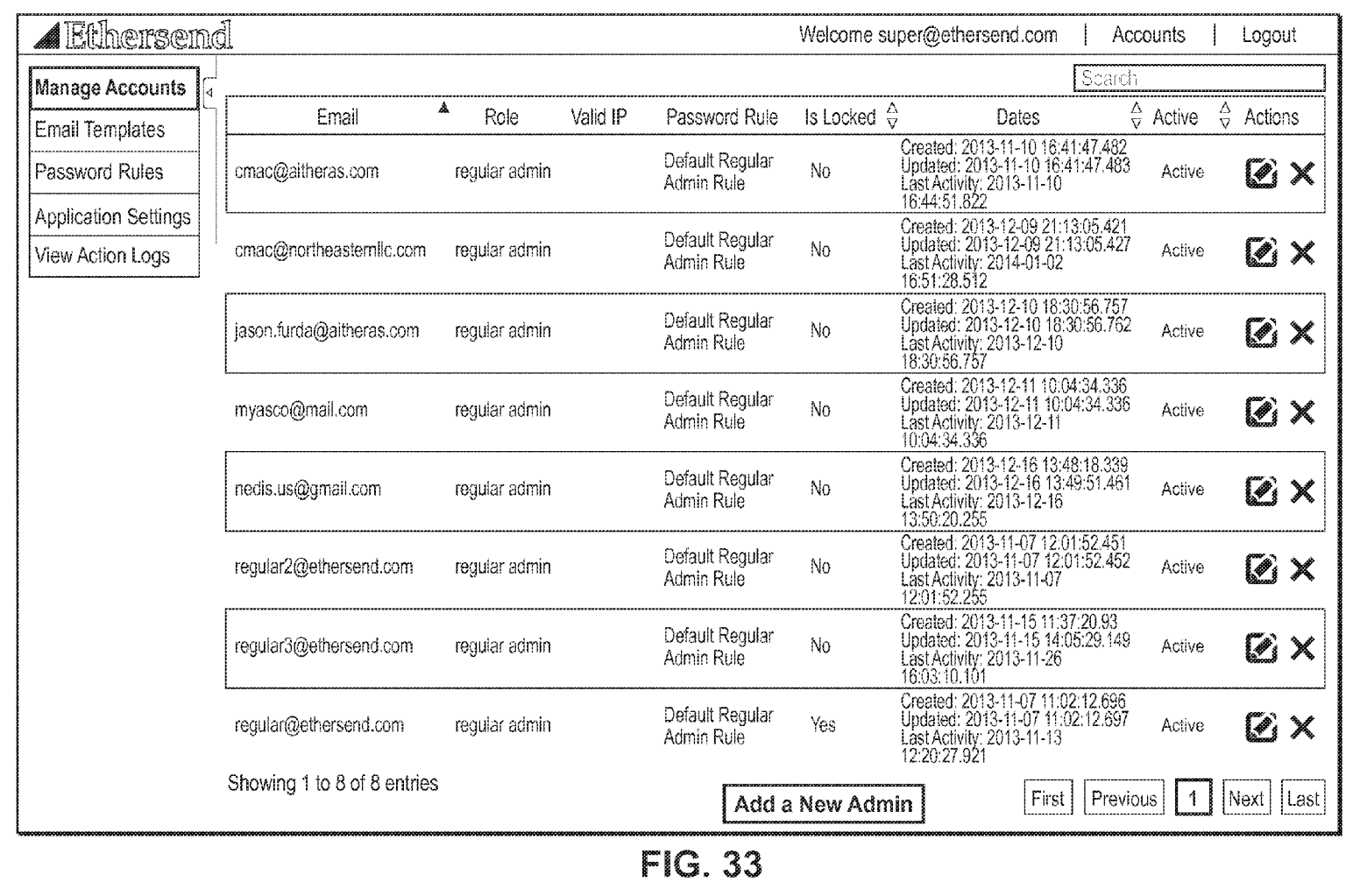

FIG. 33 is an example account management screen for the super admin user, similar to that shown in FIG. 20, in accordance with an example embodiment. From this view, the super admin user can "see" all accounts and sub-accounts for all persons and/or organizations. Modifications along the lines of those discussed above can be made by the super admin user.

FIG. 34 is an example notification template screen that may be used in accordance with an example embodiment. The super admin user may, for example, define custom notifications to be provided when accounts are activated and/or created, predefined events occur (such as, for example, when unauthorized login attempts are made; when new sub-accounts are setup and/or activated; when large changes such as privilege changes, account status changes (e.g., from free trial to paid subscription) are made; etc.); new files have been "sent" to users; encryption operations were successful or failed; items are requested; items are retrieved; and/or the like. If email messages are to be sent, the subject line, content, header information (including sender name and/or email address, for example), etc., may be specified. Similarly, if SMS messages are to be sent, content, sending number, and/or other information may be provided. It will be appreciated that the information may be tokenized, e.g., such that the system automatically inserts name, description, action, and/or other tokens at the appropriate locations, thereby creating a more custom feel to a standard message.

Figure 35:
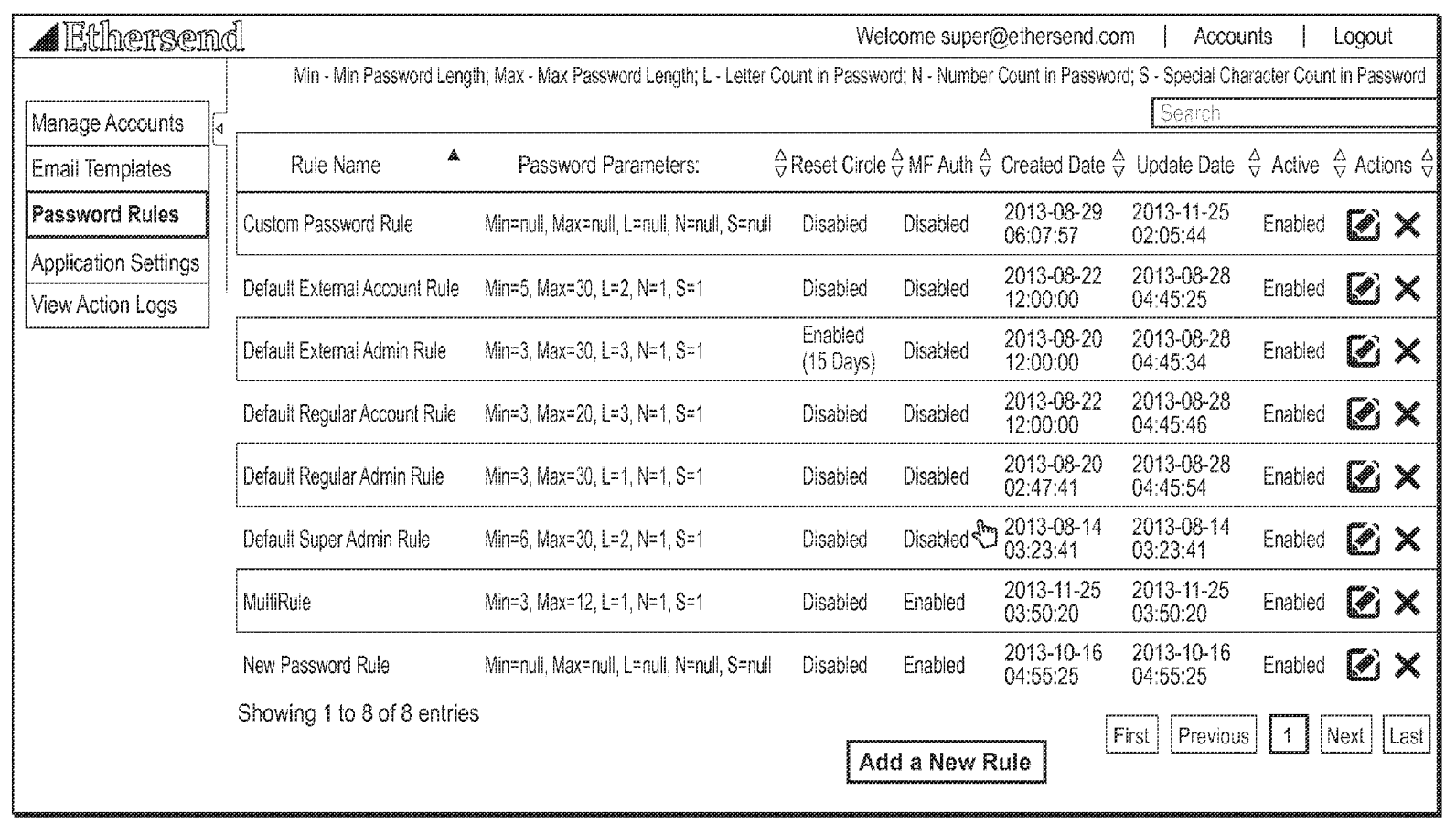

FIG. 35 is an example password rules management screen for the super admin user, similar to that shown in FIG. 16, in accordance with an example embodiment. These password rules may run across all accounts in the file transfer system in accordance with certain example embodiments.

Figure 36:
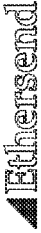
FIG. 36 is an example applications settings screen, similar to that shown in FIG. 18, in accordance with an example embodiment.
Figure 38:
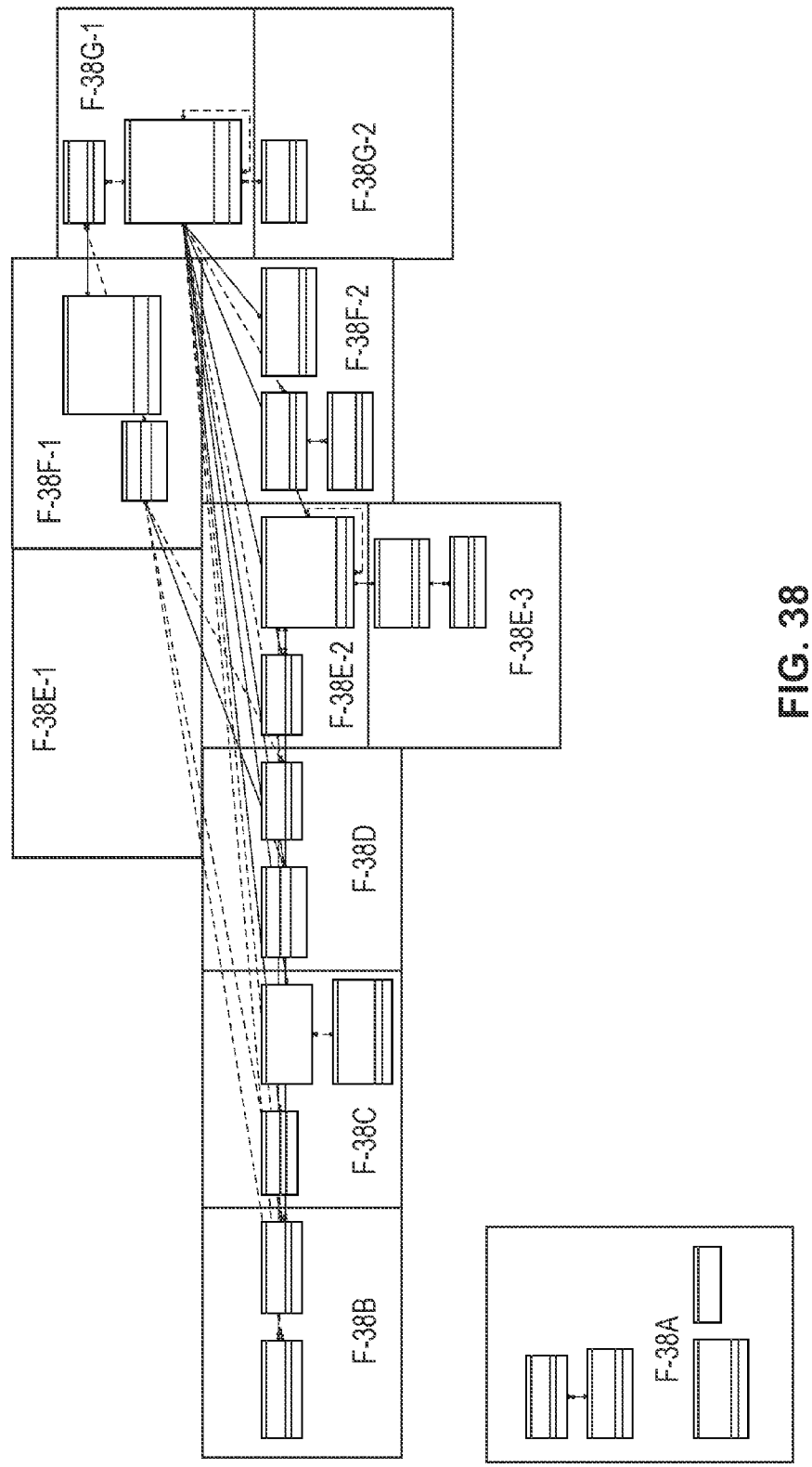
Figure 38A:
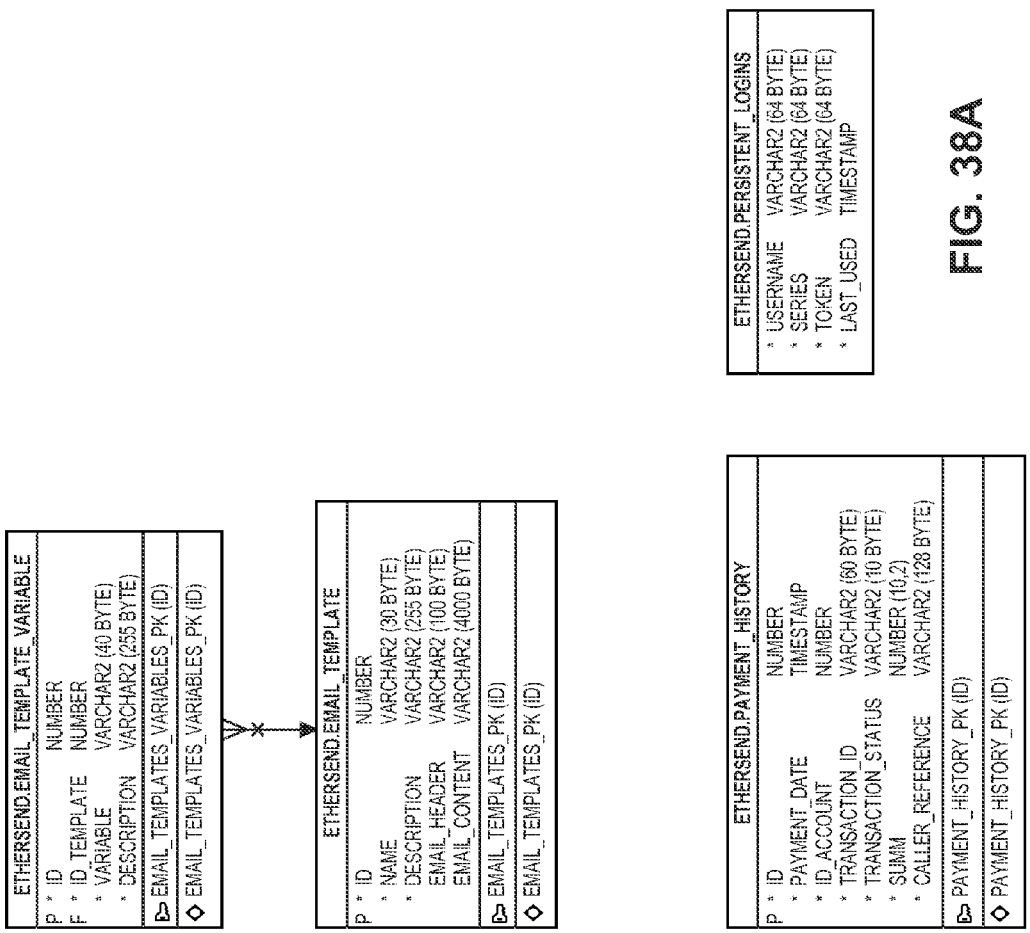
Figure 38B:
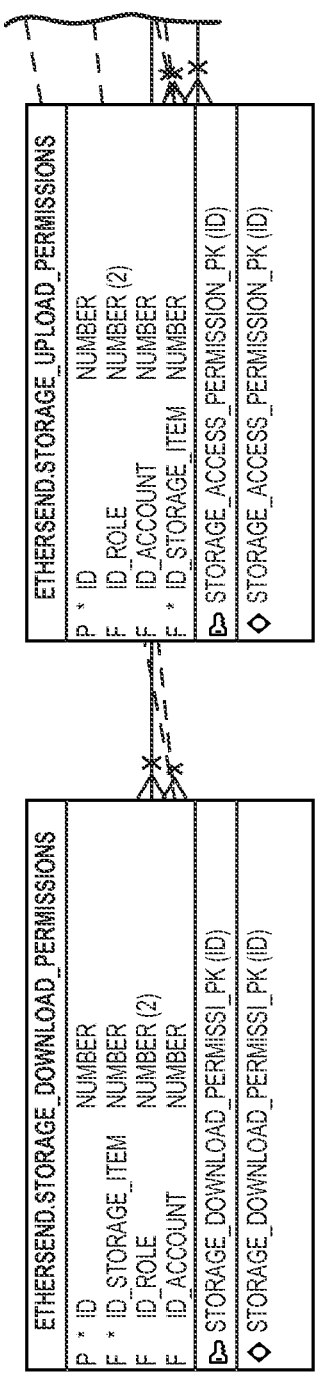
Figure 38C:
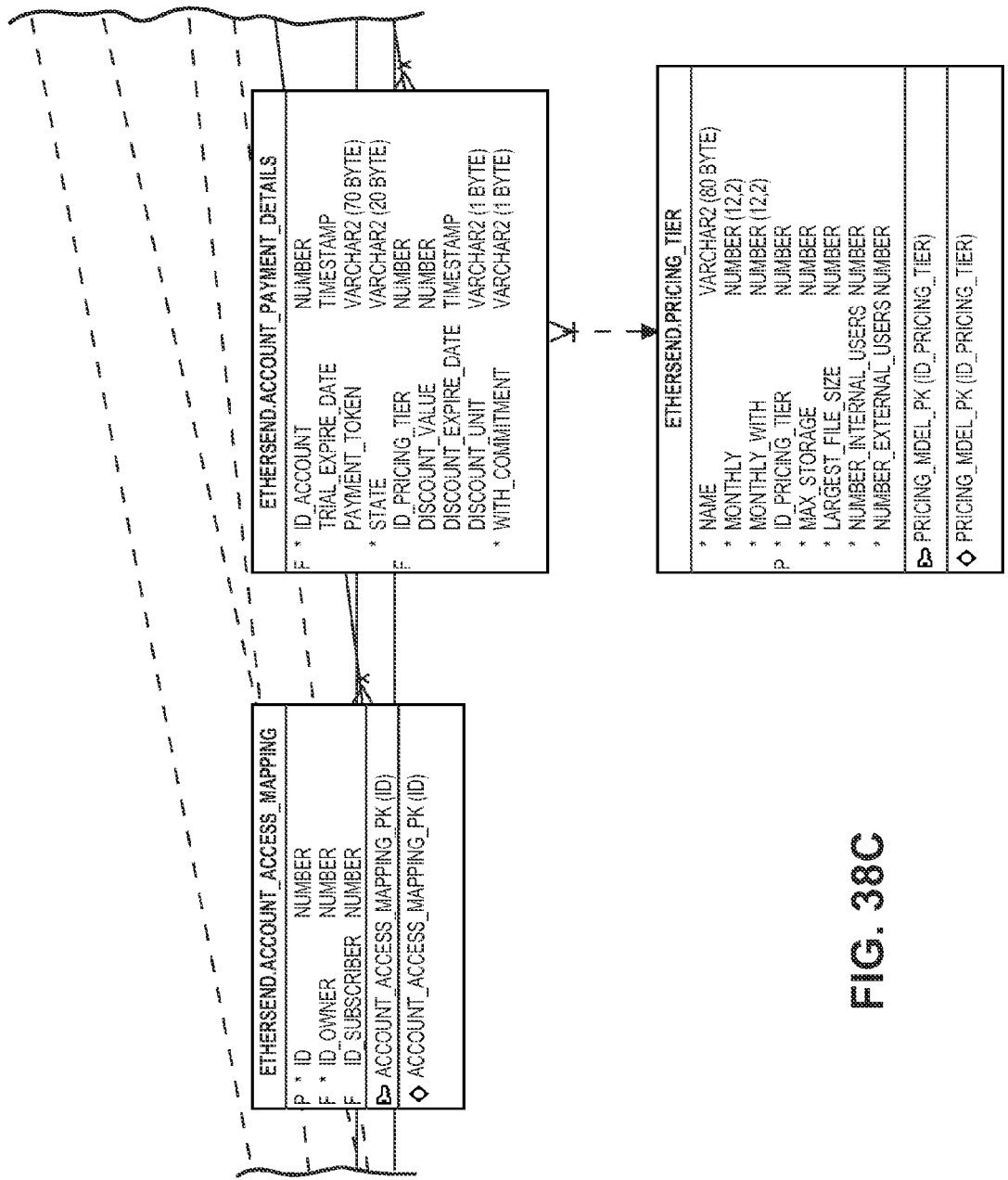
Figure 38D:
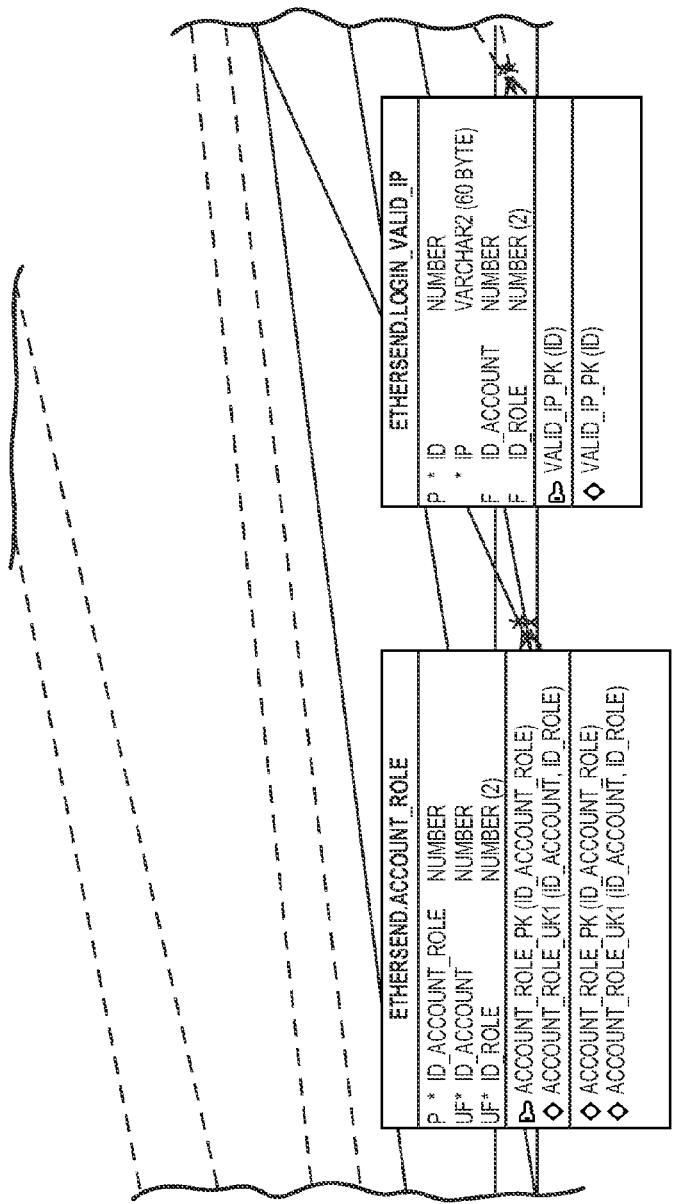
Figures 1, 38E:
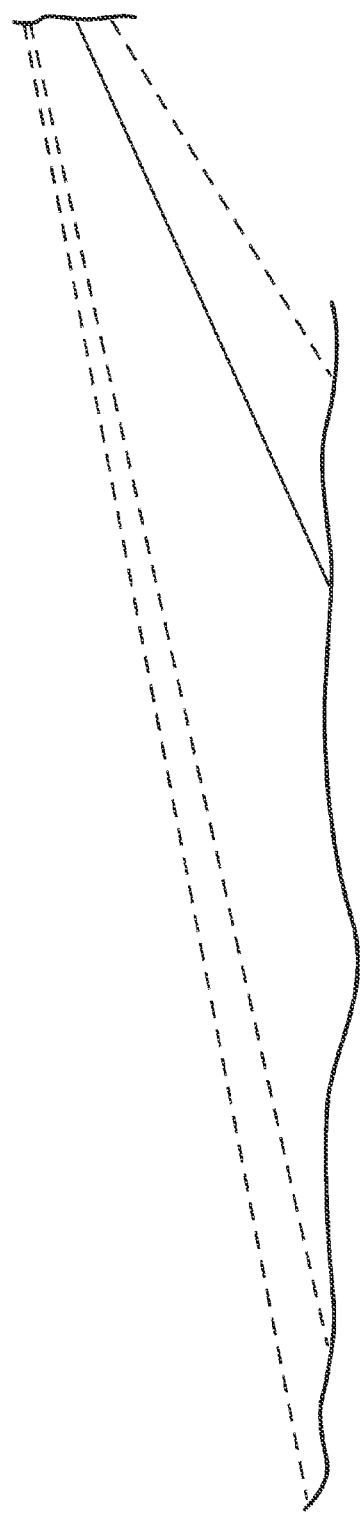
Figures 2, 38E:
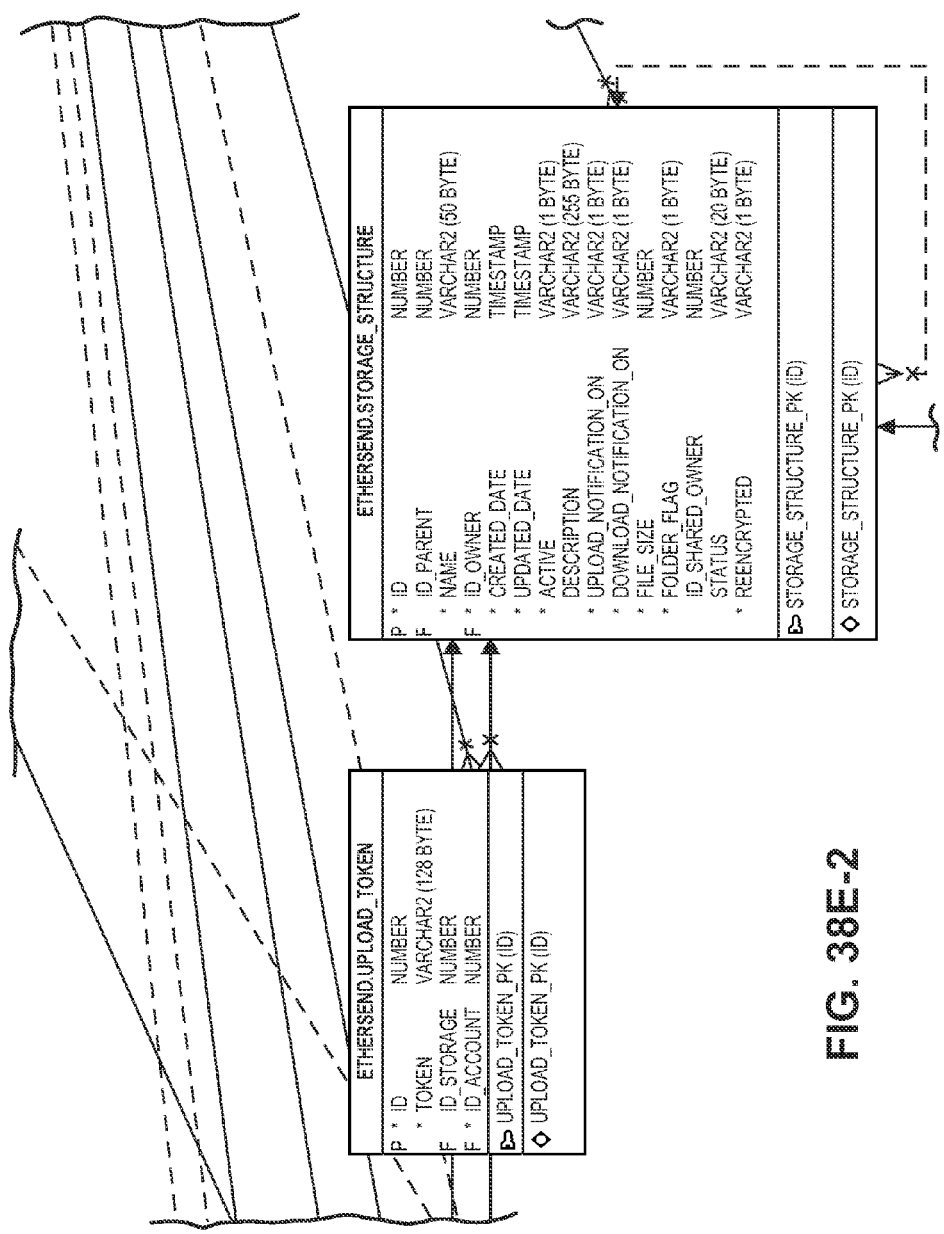
Figures 3, 38E:
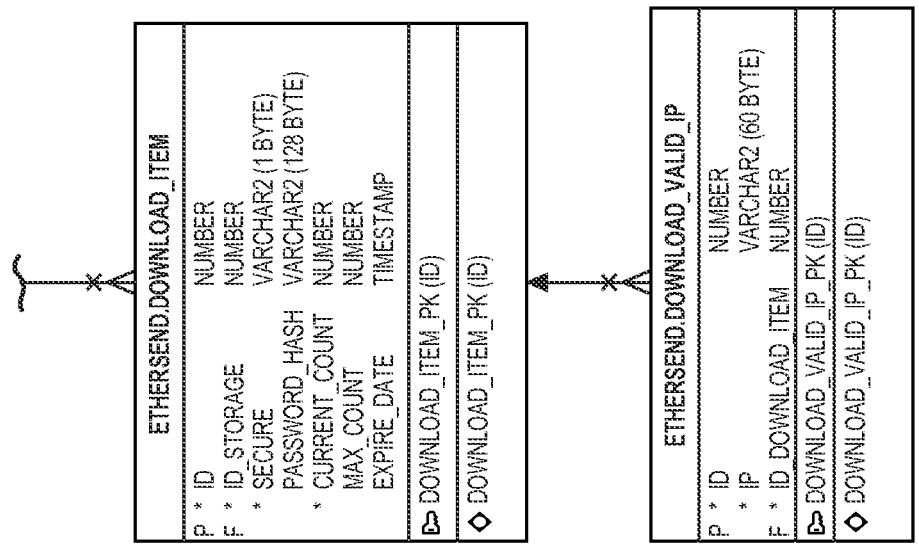
Figures 1, 38F:
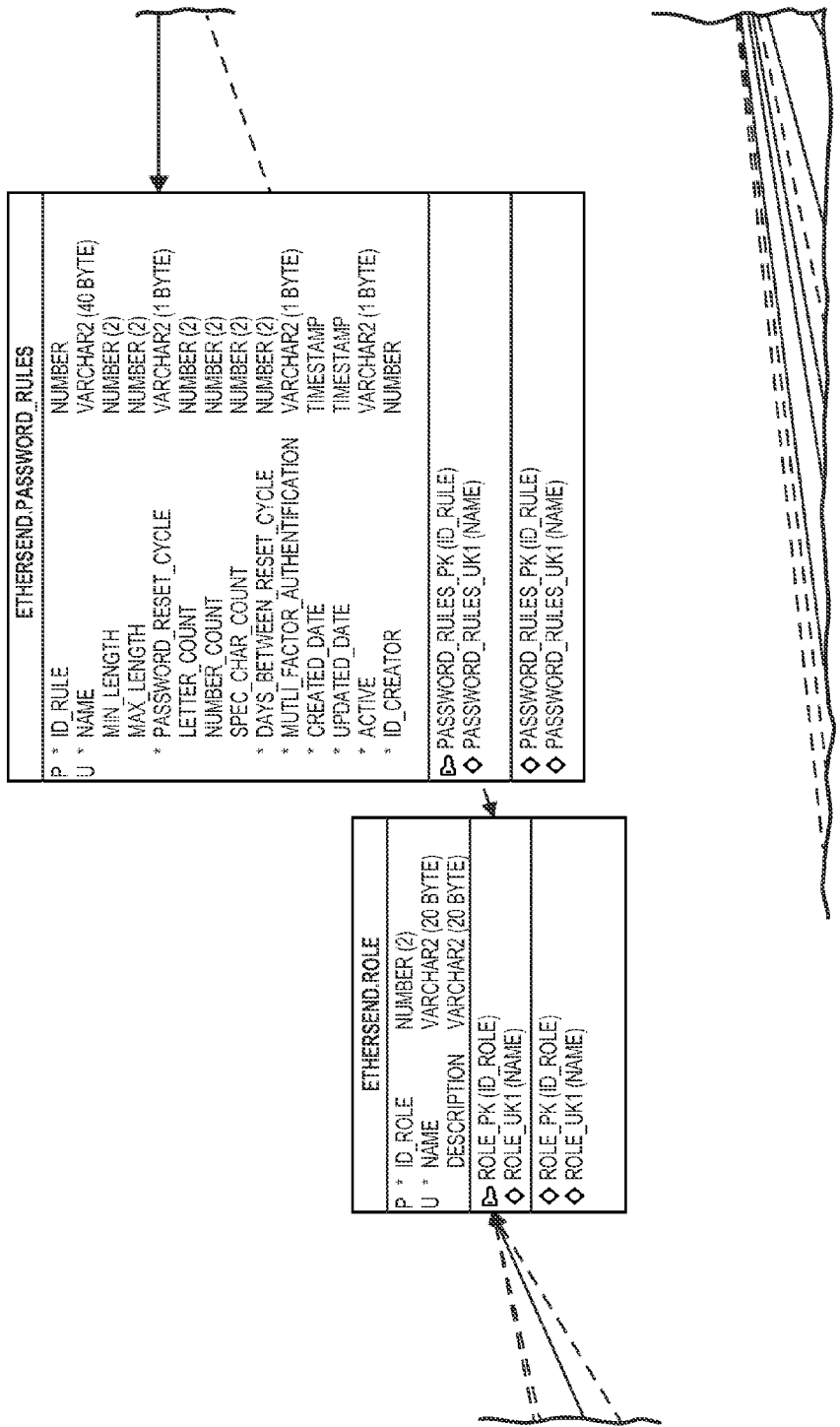
Figures 2, 38F:
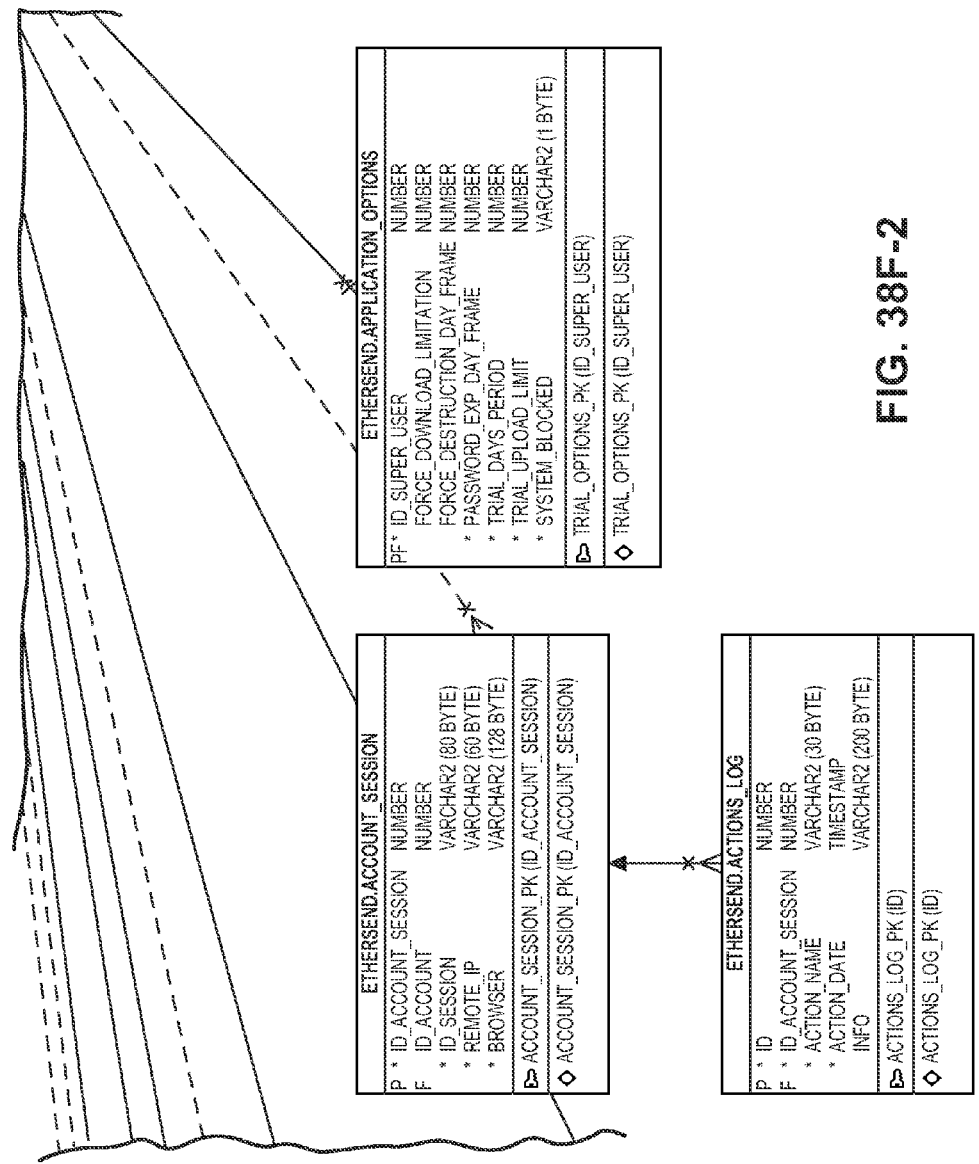
Figures 1, 38G:
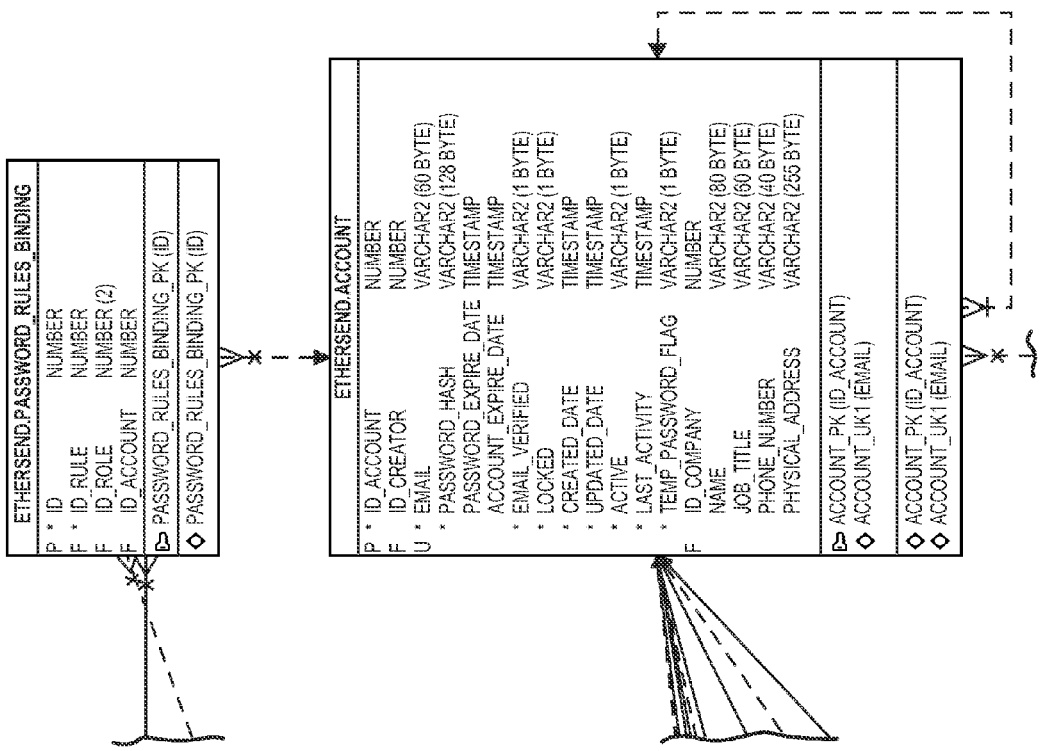
Figures 2, 38G:
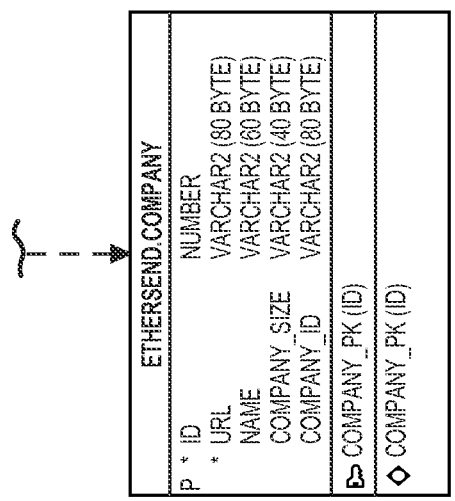

FIG. 36 is an example applications settings screen, similar to that shown in FIG. 18, in accordance with an example embodiment. It is noted, however, that the FIG. 36 example applications settings screen is expanded relative to its FIG. 18 counterpart. This enables, for example, a super admin user to specify trial and regular account parameters, as well as sizing and pricing information.

FIG. 37 is an example action log screen, similar to that shown in FIG. 19, that may be used with an example embodiment. It will be appreciated, however, that the action log is provided for all accounts registered with the secure file transfer system, at least in certain example embodiments. As above, this information may be filtered, sorted, and/or otherwise arranged for ease of reference.

FIGS. 38, 38A-D, 38E-1, 38E-2, 38E-3, 38F-1, 38F-2, 38G-1, and 38G-2 depict an example schema showing a back-end database managing overall system operations in accordance with certain example embodiments. Those skilled in the art will be able to understand the example data storable in the database, and how that example data may be connected. Those skilled in the art also will be able to understand how that data described herein may be stored to the schema. By way of example, separate tables are provided for managing accounts, user login information, user roles, application options, security options, download permissions, virtual storage structure, action logs, payment information, pricing information, templatized or boilerplate text, etc. Of course, it is understood that this schema is merely illustrative and that other arrangements of this and/or other data are of course possible in different example implementations.

Although there may in certain example embodiments appear to be a navigable folder/sub-folder structure, it will be appreciated that this information need not necessarily be tied to an actual file system running in or on the cloud provider's instances. For instance, as will be appreciated from the example schema described above and shown in FIGS. 38, 38A-D, 38E-1, 38E-2, 38E-3, 38F-1, 38F-2, 38G-1, and 38G-2, the virtual file structure of each account may be managed via a database table and/or the like. The actual file system running on the cloud may be any suitable distributed or non-distributed file system, or the like.

A super admin dashboard also may be enabled in certain example embodiments, e.g., to provide business analytics, etc. A commercial product such as, for example, Pentaho may be used for these purposes. In addition, or in the alternative, predefined views may be setup in the database to aid in "dashboarding" operations. Custom views may be predefined for customer information, system information, payment information, and/or the like.

Views relevant to customer information may include, for example, total customers, new customers today, new customers this week, new customers this month, customers lost today, customers lost this week, customers lost this month, and/or the like. Views relevant to system information may include, for example, total storage, average storage footprint per customer, total paid storage, total free storage (e.g., storage allocated to trials), total actual paid storage, total actual free storage, current number of cloud provider (e.g., EC2) instances running, average number of cloud provider instances running per hour over the last 24 hours/day/week, and/or the like. Views relevant to payment information may include, for example, total monthly revenue last month, expected revenue this month, total costs last month, expected costs this month, total cost of free accounts last month, expected cost of free accounts this month, and/or the like.

Figure 39:
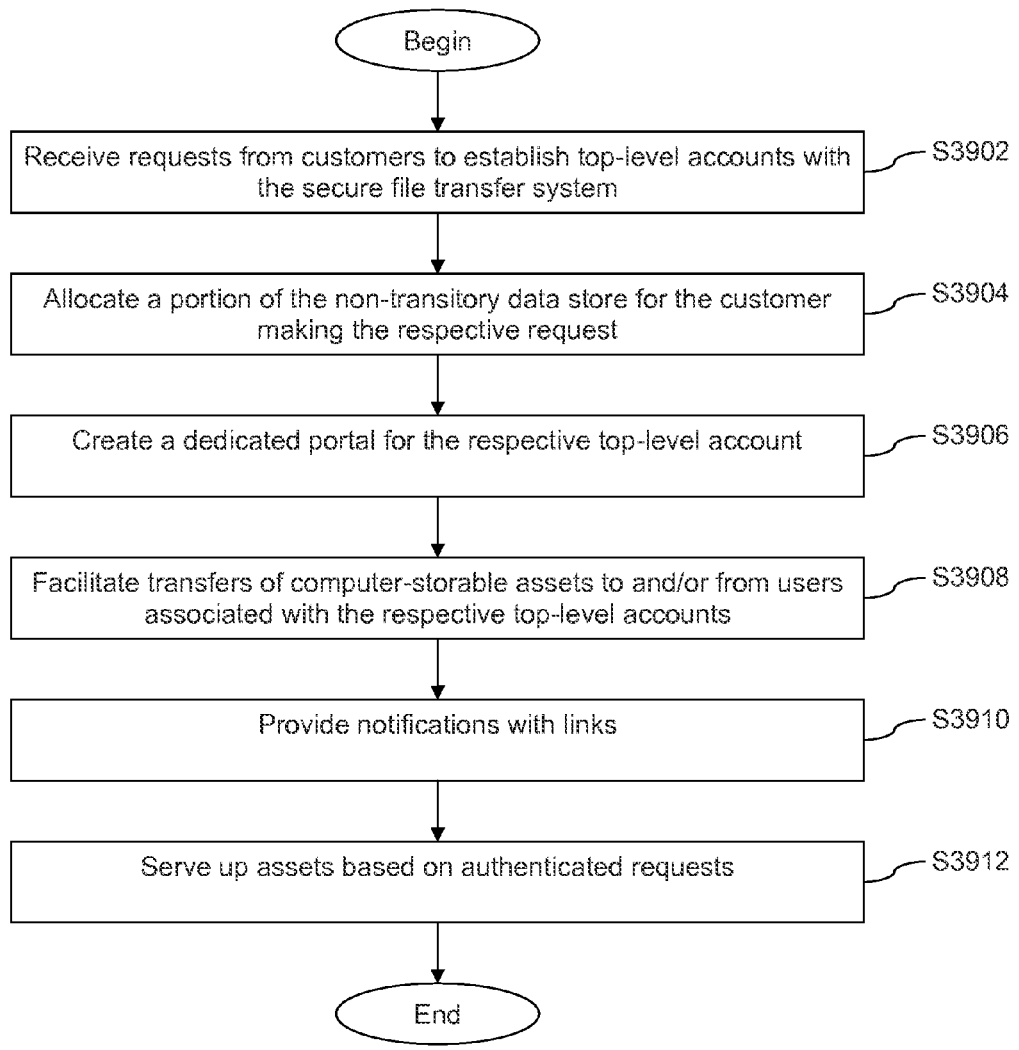
FIG. 39 is an example flowchart showing an example process associated with the overall utilization of the example secure file transfer system, in accordance with certain example embodiments.

FIG. 39 is an example flowchart showing an example process associated with the overall utilization of the example secure file transfer system, in accordance with certain example embodiments. In step S3902, requests are received from customers to establish top-level accounts with the secure file transfer system. In response to a received request to establish a top-level account, a portion of the non-transitory data store is allocated for the customer making the respective request in step S3904, and a dedicated portal is created for the respective top-level account in step S3906. In step S3908, transfers of computer-storable assets to and/or from users associated with the respective top-level accounts through downloads and/or uploads of such assets are facilitated through respective dedicated portals and using respective allocated portions of the non-transitory data store. In this regard, in step S3910, notifications are provided (e.g., via email or the like) with links to assets to be downloaded and/or helping users respond to requests to upload assets. The actual assets are served up in step S3912, e.g., using information gather from and/or using the link.

It is noted that during this example process, all or substantially all desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves. In this vein, links in notifications regarding downloads may provide, directly or indirectly, first paths from which assets are to be downloaded, the first paths being paths understandable by a file system supporting the data store, whereas links in notifications regarding upload requests may provide, directly or indirectly, second paths to which assets are to be uploaded, the second paths being paths translated from user-provided logical paths in customer-managed virtual file structures to paths understandable by the file system supporting the data store.

Certain example embodiments have been described as being locked by IP address. That is, certain example embodiments have been described in connection with whitelisted IP addresses and/or IP address ranges, blacklisted IP addresses and/or IP address ranges, etc. In addition, or in the alternative, MAC address and/or other trackable device and/or application identifiers may be used.

Although certain example embodiments have been described as screens, dialogs, and/or the like, it will appreciate that any suitable modal or non-modal arrangement may be provided, e.g., on one or more different views accessible to a user. For instance, different layouts may be provided for different device types, different browsers, etc., e.g., as detected by program logic running locally and/or on a secure file transfer system instance.

It will be appreciated that even though certain example embodiments have been described in connection with transferring files, folders, items, and/or the like, the example techniques set forth herein may accommodate the transference of any asset storable to a computer-readable storage medium.

Although certain example embodiments have been described in connection with companies, organizations, individuals, etc., it will be appreciated that the techniques disclosed herein may involve instances for any suitable combination of user types. For instance, regardless of whether a particular top-level account holder is a global enterprise or an individual with limited needs, the instances may be sufficiently flexible and dynamically configurable to scale accordingly to accommodate enterprise-level processing, storage, and/or other requirements. This may include, for example, being sufficiently flexible and dynamically configurable to accommodate complicated virtual file structures, and/or the like, supporting tens or even hundreds of terabytes of data and/or beyond in certain example instances—with that data for any given instance potentially being accessible by thousands, tens of thousands, or even millions of users.

It will be appreciated that as used herein, the terms system, subsystem, service, engine, module, programmed logic circuitry, and/or the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute or interpret instructions that may be tangibly stored on a non-transitory computer readable storage medium.

In certain example embodiments, there is provided a secure file transfer system comprising processing resources including at least one processor and a memory, and a non-transitory data store. The processing resources are configured to: receive requests from customers to establish top-level accounts with the secure file transfer system; in response to received requests, allocate portions of the non-transitory data store for the customers making the respective requests, and create a dedicated portal for each said top-level account; and facilitate transfers of computer-storable assets to and/or from users associated with the respective top-level accounts through downloads and/or uploads of such assets through the respective dedicated portals and using the respective allocated portions of the non-transitory data store. All or substantially all desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

In certain example embodiments, a method of operating a secure file transfer system having processing resources including at least one processor and a memory, as well as a non-transitory data store, is provided. Requests are received from customers to establish top-level accounts with the secure file transfer system. In response to a received request to establish a top-level account: a portion of the non-transitory data store is allocated for the customer making the respective request, and a dedicated portal is created for the respective top-level account. Transfers of computer-storable assets to and/or from users associated with the respective top-level accounts through downloads and/or uploads of such assets are facilitated through respective dedicated portals and using respective allocated portions of the non-transitory data store. All or substantially all desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

In certain example embodiments, there is provided at least one non-transitory computer readable storage medium tangibly storing instructions that, when performed by processing resources including at least one processor of a secure file transfer system, at least: process requests received from customers to establish top-level accounts with the secure file transfer system; in response to a received request to establish a top-level account: allocate a portion of a non-transitory data store of the secure file transfer system for the customer making the respective request, and create a dedicated portal for each said top-level account; and facilitate transfers of computer-storable assets to and/or from users associated with the respective top-level accounts through downloads and/or uploads of such assets through the respective dedicated portals and using the respective allocated portions of the non-transitory data store. All or substantially all desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

In addition to the features of any of the three preceding paragraphs, in certain example embodiments, there may be provided for each said top-level account, (a) a definition of one or more user roles and accompanying privileges relative to the secure file transfer system for each said user role, and (b) a mapping between a user associated with the top-level account and a defined user role. Apart from a top-level account owner user role, all other user roles and accompanying privileges may be customer-definable and mappable to users by the customer.

In addition to the features of the preceding paragraph, in certain example embodiments, user roles may be definable by the customers for parties external to the respective customers. In some instances, plural user roles may be defined for parties external to the respective customers, with the plural user roles being hierarchical.

In addition to the features of any of the five preceding paragraphs, in certain example embodiments, hierarchically arranged user roles may be assignable to each user of each said top-level account, with exactly one top-level account owner user role being defined for each said top-level account and being the highest level in the hierarchy for the respective top-level account. Other than the top-level account owner user roles, customers may be free to assign user roles to their users.

In addition to the features of any of the five preceding paragraphs, in certain example embodiments, each said top-level account may be scalable to accommodate enterprise levels of data throughput and storage, as well as enterprise levels of user numbers. For instance, in certain example embodiments, each said top-level account may be scalable to accommodate enterprise levels of data throughput and storage, as well as enterprise levels of user numbers, even though a need for corresponding scalability is not necessarily known to the secure file transfer system prior to being triggered by actual usage of the secure file transfer system. In this regard, the secure file transfer system in certain example embodiments may be configured to dynamically adjust, on an individual top-level account basis, processing resource and/or storage space utilization based on a measure of actual or expected need. However, in some example instances, upward adjustments in processing resource and/or storage space utilization for each said top-level account may be capped based on tiers to which the respective customers belong.

In addition to the features of any of the six preceding paragraphs, in certain example embodiments, each said top-level account may support a virtual file structure into which its computer-storable assets are storable. However, according to certain example embodiments, a file system associated with the data store may be unrelated to virtual file structures, except that (a) the assets of any given top-level account may be preferentially grouped together on one or more common nodes by the secure file transfer system and/or the file system, and (b) the assets may be "bucketized" for different accounts.

In addition to the features of any of the seven preceding paragraphs, in certain example embodiments, procedural approaches to be used in transferring computer-storable assets may indicate whether each said customer anticipates transferring assets with: (a) one or more other customers; (b) one or more users who are not customers but have one or more respective portals set up for them by the respective customer; (c) one or more users who are not customers and do not have any portals set up for them; and/or (d) one or more users using an API that communicates with the secure file transfer system. According to certain example embodiments, at least some client devices involved in transferences of computer-storable assets may be external to the respective customers and may have sub-accounts created by those customers wishing to exchange files with them.

In addition to the features of any of the eight preceding paragraphs, in certain example embodiments, an email notification module may be configured to send email notifications to users letting them know that assets are ready to be downloaded and/or requesting that assets be uploaded.

In addition to the features of the preceding paragraph, in certain example embodiments, email notifications may include links to portals facilitating the downloading and/or uploading of assets.

In addition to the features of the preceding paragraph, in certain example embodiments, the links may provide, directly or indirectly, information regarding authentication requirements that must be satisfied before assets can be downloaded and/or uploaded.

In addition to the features of either of the two preceding paragraphs, in certain example embodiments, the links may provide, directly or indirectly, a path from which an asset is to be downloaded and/or to which an asset it to be uploaded.

In addition to the features of the preceding paragraph, in certain example embodiments, the path may be a path from which an asset is to be downloaded and is understandable by a file system supporting the data store; and/or the path may be a path to which an asset it to be uploaded and is translated from a user-provided logical path in a virtual file structure to a more concrete path understandable by a file system supporting the data store.

In certain example embodiments, a file transfer system is provided. There are provided processing resources including at least one processor, and a non-transitory data store. The processing resources are configured to: maintain a plurality of file transfer system instances, each said file transfer system instance being scalable to accommodate a number of users expected for an enterprise-wide operation and an amount of data suitable for an enterprise, regardless of how many users actually use, and how much data is actually stored to the non-transitory data store in connection with, the respective file transfer system instance; generate new file transfer system instances upon receipt of corresponding verified user requests; for each said file transfer system instance, provide a sub-delegable delegation of authority to exactly one administrator of the respective file transfer system instance that at least enables specification of an approach to be used in sharing data storable to the non-transitory data store among and/or between users who, directly or indirectly, use the respective file transfer system instance; and for each said file transfer system instance, facilitate the sharing of data, using the non-transitory data store and the respective specified approach to be used in sharing data, and in accordance with the respective sub-delegable delegation of authority, among and/or between the users who, directly or indirectly, use the respective file transfer system instance. For each said file transfer system instance, (a) how the respective approach to be used in sharing data will be specified, (b) whether and how the respective sub-delegable delegation of authority will be distributed, (c) the identities of users, other than the one administrator, who will actually use the respective file transfer system instance, and (d) the amount of data that actually will be stored in connection with the respective file transfer system instance, are at least initially not known to the file transfer system and thereafter can be influenced by users in accordance with the respective sub-delegable delegation of authority in ways not knowable to the file transfer system in advance. Corresponding methods and/or non-transitory computer readable storage media may be provided in certain example embodiments. In certain example embodiments, the features of any of the 11 preceding paragraphs may be used in connection with this example arrangement.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A secure file transfer system, comprising:
    processing resources including at least one processor and a memory; and
    a non-transitory data store;
    wherein the processing resources are configured to:
        receive requests from customers to establish top-level accounts with the secure file transfer system,
        in response to received requests:
            allocate portions of the non-transitory data store for the customers making the respective requests, and
            create a dedicated portal for each said top-level account, and
        facilitate transfers of computer-storable assets to and/or from users associated with the respective top-level accounts through downloads and/or uploads of such assets through the respective dedicated portals and using the respective allocated portions of the non-transitory data store; and
    wherein desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

2. The system of claim 1, further comprising, for each said top-level account, (a) a definition of one or more user roles and accompanying privileges relative to the secure file transfer system for each said user role, and (b) a mapping between a user associated with the top-level account and a defined user role,
    wherein apart from a top-level account owner user role, all other user roles and accompanying privileges are customer-definable and mappable to users by the customer.

3. The system of claim 2, wherein user roles are definable by the customers for parties external to the respective customers.

4. The system of claim 3, wherein plural user roles are defined for parties external to the respective customers, the plural user roles being hierarchical.

5. The system of claim 1, wherein hierarchically arranged user roles are assignable to each user of each said top-level account, exactly one top-level account owner user role being defined for each said top-level account and being the highest level in the hierarchy for the respective top-level account, and wherein other than the top-level account owner user roles, customers are free to assign user roles to their users.

6. The system of claim 1, wherein each said top-level account is scalable to accommodate enterprise levels of data throughput and storage, as well as enterprise levels of user numbers.

7. The system of claim 1, wherein each said top-level account is scalable to accommodate enterprise levels of data throughput and storage, as well as enterprise levels of user numbers, even though a need for corresponding scalability is not necessarily known to the secure file transfer system prior to being triggered by actual usage of the secure file transfer system.

8. The system of claim 7, wherein the secure file transfer system is configured to dynamically adjust, on an individual top-level account basis, processing resource and/or storage space utilization based on a measure of actual or expected need.

9. The system of claim 8, wherein upward adjustments in processing resource and/or storage space utilization for each said top-level account are capped based on tiers to which the respective customers belong.

10. The system of claim 1, wherein each said top-level account supports a virtual file structure into which its computer-storable assets are storable.

11. The system of claim 10, wherein a file system associated with the data store is unrelated to virtual file structures, except that the assets of any given top-level account are preferentially grouped together on one or more common nodes by the secure file transfer system and/or the file system.

12. The system of claim 1, wherein procedural approaches to be used in transferring computer-storable assets indicate whether each said customer anticipates transferring assets with: (a) one or more other customers; (b) one or more users who are not customers but have one or more respective portals set up for them by the respective customer; (c) one or more users who are not customers and do not have any portals set up for them; and/or (d) one or more users using an API that communicates with the secure file transfer system.

13. The system of claim 12, wherein at least some client devices involved in transferences of computer-storable assets are external to the respective customers and have sub-accounts created by those customers wishing to exchange files with them.

14. The system of claim 1, further comprising an email notification module configured to send email notifications to users letting them know that assets are ready to be downloaded and/or requesting that assets be uploaded.

15. The system of claim 14, wherein email notifications include links to portals facilitating the downloading and/or uploading of assets.

16. The system of claim 15, wherein the links provide, directly or indirectly, information regarding authentication requirements that must be satisfied before assets can be downloaded and/or uploaded.

17. The system of claim 15, wherein the links provide, directly or indirectly, a path from which an asset is to be downloaded and/or to which an asset it to be uploaded.

18. The system of claim 17, wherein the path is a path from which an asset is to be downloaded and is understandable by a file system supporting the data store.

19. The system of claim 17, wherein the path is a path to which an asset it to be uploaded and is translated from a user-provided logical path in a virtual file structure to a more concrete path understandable by a file system supporting the data store.

20. The system of claim 1, wherein all desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

21. A method of operating a secure file transfer system having processing resources including at least one processor and a memory, as well as a non-transitory data store, the method comprising:
   receiving requests from customers to establish top-level accounts with the secure file transfer system;
   in response to a received request to establish a top-level account:
      allocating a portion of the non-transitory data store for the customer making the respective request, and
      creating a dedicated portal for the respective top-level account; and
   facilitating transfers of computer-storable assets to and/or from users associated with the respective top-level accounts through downloads and/or uploads of such assets through respective dedicated portals and using respective allocated portions of the non-transitory data store; and
   wherein desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

22. The method of claim 21, further comprising:
   assigning to exactly one user of each said account a top-level account owner user role; and
   delegating to each said customer the ability to assign hierarchical user roles to users associated with the respective top-level account, the assignable hierarchical user roles being below the level of the top-level account owner user role.

23. The method of claim 21, wherein each said top-level account is scalable to accommodate enterprise levels of data throughput and storage, as well as enterprise levels of user numbers, even though a need for corresponding scalability is not necessarily known to the secure file transfer system prior to being triggered by actual usage of the secure file transfer system, and further comprising:
   dynamically adjusting, on an individual top-level account basis, allowed processing resource and/or storage space utilization based on a measure of actual or expected need for the respective top-level account.

24. The method of claim 21, further comprising storing assets for a given top-level account in accordance with a virtual file structure designed and managed by authorized users of the given top-level account.

25. The method of claim 21, wherein procedural approaches to be used in transferring computer-storable assets indicate whether each said customer anticipates transferring assets with: (a) one or more other customers; (b) one or more users who are not customers but have one or more respective portals set up for them by the respective customer; (c) one or more users who are not customers and do not have any portals set up for them; and/or (d) one or more users using an API that communicates with the secure file transfer system.

26. The method of claim 25, wherein at least some client devices involved in transferences of computer-storable assets are external to the respective customers and have sub-accounts created by those customers wishing to exchange files with them.

27. The method of claim 21, further comprising:
   emailing, using the processing resources, first notifications to users letting them know that assets are ready to be downloaded; and
   emailing, using the processing resources, second notifications, requesting that assets be uploaded.

28. The method of claim 27, wherein the first and second notifications include links to portals facilitating the downloading and/or uploading of assets.

29. The method of claim 28, wherein:
   links in the first notifications provide, directly or indirectly, first paths from which assets are to be downloaded, the first paths being paths understandable by a file system supporting the data store, and
   links in the second notifications provide, directly or indirectly, second paths to which assets are to be uploaded, the second paths being paths translated from user-provided logical paths in customer-managed virtual file structures to paths understandable by the file system supporting the data store.

30. The method of claim 21, wherein all desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

31. At least one non-transitory computer readable storage medium tangibly storing instructions that, when performed by processing resources including at least one processor of a secure file transfer system, at least:
   process requests received from customers to establish top-level accounts with the secure file transfer system;
   in response to a received request to establish a top-level account:
      allocate a portion of a non-transitory data store of the secure file transfer system for the customer making the respective request, and
      create a dedicated portal for each said top-level account; and
   facilitate transfers of computer-storable assets to and/or from users associated with the respective top-level accounts through downloads and/or uploads of such assets through the respective dedicated portals and using the respective allocated portions of the non-transitory data store; and
   wherein desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

32. The at least one non-transitory computer readable storage medium of claim 31, wherein:
   each said top-level account is scalable to accommodate enterprise levels of data throughput and storage, as well as enterprise levels of user numbers, even though a need for corresponding scalability is not necessarily known to the secure file transfer system prior to being triggered by actual usage of the secure file transfer system;

procedural approaches to be used in transferring computer-storable assets indicate whether each said customer anticipates transferring assets with: (a) one or more other customers; (b) one or more users who are not customers but have one or more respective portals set up for them by the respective customer; (c) one or more users who are not customers and do not have any portals set up for them; and/or (d) one or more users using an API that communicates with the secure file transfer system;

at least some client devices involved in transferences of computer-storable assets are external to the respective customers and have sub-accounts created by those customers wishing to exchange files with them; and further instructions are provided to at least enable:
assignment to exactly one user of each said account a top-level account owner user role,
delegation to each said customer the ability to assign hierarchical user roles to users associated with the respective top-level account, the assignable hierarchical user roles being below the level of the top-level account owner user role,
emailing, using the processing resources, first notifications to users letting them know that assets are ready to be downloaded, and
emailing, using the processing resources, second notifications, requesting that assets be uploaded, and wherein the first and second notifications include links to portals facilitating the downloading and/or uploading of assets.

33. The at least one non-transitory computer readable storage medium of claim 31, wherein all desired top-level account configuration details, including procedural approaches to be used in transferring computer-storable assets, whether client devices involved in transferences of computer-storable assets are internal and/or external to the respective customers, and aspects of how the top-level account will be managed in terms of user roles, are not known to the secure file transfer system prior to being deployed by the top-level account customers themselves.

34. A file transfer system, comprising:
processing resources including at least one processor; and
a non-transitory data store;
wherein the processing resources are configured to:
maintain a plurality of file transfer system instances, each said file transfer system instance being scalable to accommodate a number of users expected for an enterprise-wide operation and an amount of data suitable for an enterprise, regardless of how many users actually use, and how much data is actually stored to the non-transitory data store in connection with, the respective file transfer system instance;
generate new file transfer system instances upon receipt of corresponding verified user requests;
for each said file transfer system instance, provide a sub-delegable delegation of authority to exactly one administrator of the respective file transfer system instance that at least enables specification of an approach to be used in sharing data storable to the non-transitory data store among and/or between users who, directly or indirectly, use the respective file transfer system instance; and
for each said file transfer system instance, facilitate the sharing of data, using the non-transitory data store and the respective specified approach to be used in sharing data, and in accordance with the respective sub-delegable delegation of authority, among and/or between the users who, directly or indirectly, use the respective file transfer system instance; and
wherein, for each said file transfer system instance, (a) how the respective approach to be used in sharing data will be specified, (b) whether and how the respective sub-delegable delegation of authority will be distributed, (c) the identities of users, other than the one administrator, who will actually use the respective file transfer system instance, and (d) the amount of data that actually will be stored in connection with the respective file transfer system instance, are at least initially not known to the file transfer system and thereafter can be influenced by users in accordance with the respective sub-delegable delegation of authority in ways not knowable to the file transfer system in advance.

\* \* \* \* \*